(12) United States Patent
Lyons et al.

(10) Patent No.: US 10,253,856 B2
(45) Date of Patent: Apr. 9, 2019

(54) CHAIN MOORING WINDLASS WITH TWO-STAGE GEAR REDUCTION AND MOVABLE DRIVE MECHANISM

(71) Applicants:Daniel Lyons, Lompoc, CA (US); Robert Taylor, Santa Barbara, CA (US); Kanghua Sun, Ventura, CA (US); Charlie O'Rourke, Goleta, CA (US); Tom Miller, Goleta, CA (US); Nick Atallah, Goleta, CA (US); Matt Frowiss, Goleta, CA (US)

(72) Inventors: Daniel Lyons, Lompoc, CA (US); Robert Taylor, Santa Barbara, CA (US); Kanghua Sun, Ventura, CA (US); Charlie O'Rourke, Goleta, CA (US); Tom Miller, Goleta, CA (US); Nick Atallah, Goleta, CA (US); Matt Frowiss, Goleta, CA (US)

(73) Assignee: Bardex Corporation, Goleta, CA (US)

( * ) Notice: Subject to any disclaimer, the term of this patent is extended or adjusted under 35 U.S.C. 154(b) by 0 days.

(21) Appl. No.: 15/620,538

(22) Filed: Jun. 12, 2017

(65) Prior Publication Data

US 2017/0370455 A1     Dec. 28, 2017

Related U.S. Application Data

(60) Provisional application No. 62/348,597, filed on Jun. 10, 2016.

(51) Int. Cl.
*F16H 37/04* (2006.01)
*B63B 21/22* (2006.01)
(Continued)

(52) U.S. Cl.
CPC ............ *F16H 37/041* (2013.01); *B63B 21/18* (2013.01); *B63B 21/22* (2013.01); *B63B 21/50* (2013.01);
(Continued)

(58) Field of Classification Search
CPC ......... B63B 21/00; B63B 21/18; B63B 21/22; B63B 21/50; B66D 1/00; B66D 1/72;
(Continued)

(56) References Cited

U.S. PATENT DOCUMENTS

| 1,929,641 A | 10/1933 | Koons |
|---|---|---|
| 3,658,299 A | 4/1972 | Sprague |

(Continued)

OTHER PUBLICATIONS

Notification of Transmittal of International Search Report and Written Opinion dated Oct. 30, 2017 (issued in PCT Application No. PCT/US2017/037046) [12 pages].

*Primary Examiner* — Lars A Olson
(74) *Attorney, Agent, or Firm* — Michael S. McCoy; Amatong McCoy LLC

(57) ABSTRACT

A chain mooring windlass may include a frame, a wheel, and an axel extending through the wheel and rotatably coupled to the frame. Drive assemblies may be coupled to the axel via a first stage gear reduction including reduction gears. The axel may be coupled to the wheel via a second stage gear reduction including reduction gears. A movable drive mechanism may include reduction gears, and drive assemblies coupled to the reduction gears. The drive assemblies may drive the reduction gears. A drive gear may be coupled to the reduction gears. The reduction gears may drive the drive gear. The drive gear may be configured to couple to a chain wheel of a chain mooring windlass to drive the chain wheel. A chain wheel coupler may be configured to selectively couple the movable drive mechanism to a chain wheel of a chain mooring windlass.

26 Claims, 29 Drawing Sheets

(51) Int. Cl.
  *B63B 21/50* (2006.01)
  *F16H 1/06* (2006.01)
  *F16H 1/28* (2006.01)
  *F16H 57/02* (2012.01)
  *B63B 21/18* (2006.01)
  *B66D 1/72* (2006.01)

(52) U.S. Cl.
  CPC ............... *B66D 1/72* (2013.01); *F16H 1/06* (2013.01); *F16H 1/28* (2013.01); *F16H 57/02* (2013.01)

(58) Field of Classification Search
  CPC ... B66D 1/741; F16H 1/06; F16H 1/28; F16H 37/041; F16H 57/02
  USPC .......................................... 114/230.23, 293
  See application file for complete search history.

(56) References Cited

U.S. PATENT DOCUMENTS

| | | | |
|---|---|---|---|
| 3,968,998 A | * | 7/1976 | Wolf .................. A01F 25/20 |
| | | | 241/260.1 |
| 4,476,801 A | | 10/1984 | Foster et al. |
| 4,722,293 A | | 2/1988 | Foster et al. |
| 6,070,858 A | | 6/2000 | Hase et al. |
| 2003/0107030 A1 | | 6/2003 | Sozzi |
| 2006/0249719 A1 | | 11/2006 | Lesko |
| 2013/0116075 A1 | | 5/2013 | Miller et al. |
| 2017/0259886 A1 | | 9/2017 | O'Rourke et al. |
| 2017/0334525 A1 | | 11/2017 | O'Rourke |

\* cited by examiner

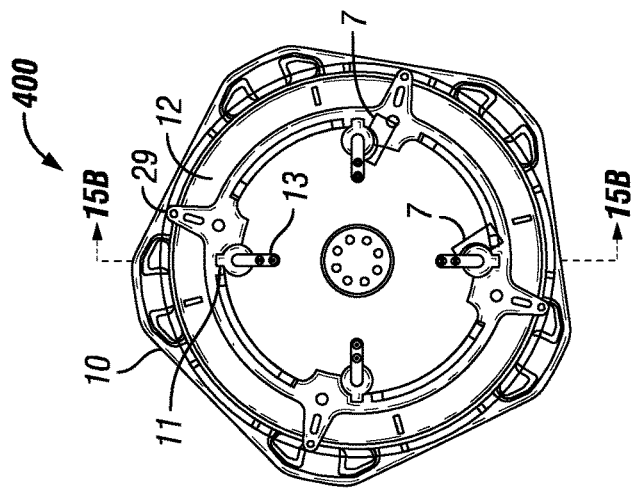

CHAIN MOORING WINDLASS WITH TWO-STAGE GEAR REDUCTION AND MOVABLE DRIVE MECHANISM

CROSS-REFERENCE TO RELATED APPLICATIONS

The present application claims the benefit of U.S. Provisional Patent Application No. 62/348,597, filed in Jun. 10, 2016, the entirety of which is incorporated herein by reference.

FIELD

The present disclosure relates to a dual chain mooring windlass with two-stage gear reduction, and to a movable drive mechanism for selectively driving multiple windlasses.

BACKGROUND

Windlasses are typically used to move heavy weight. One type of windlass, mooring windlasses, are used to pull-in or pay-out mooring lines to moor offshore vessels. Mooring windlasses may be driven by a motor, such as a hydraulic or electrically driven motor.

In some applications, multiple mooring windlasses are used to moor a single offshore vessel. In such applications, provision of a separate drive mechanism, e.g. a hydraulic or electric motor, for each windlass increases the financial costs associated with mooring the offshore vessel.

BRIEF SUMMARY

An embodiment of the present disclosure relates a chain mooring windlass having a two-stage gear reduction. The chain mooring windlass may include a windlass frame, a chain wheel, and a chain wheel axel extending through the chain wheel and rotatably coupled to the windlass frame. Drive assemblies may be operatively coupled to the chain wheel axel via a first stage gear reduction including reduction gears. The chain wheel axel may be operatively coupled to the chain wheel via a second stage gear reduction including reduction gears.

Another embodiment of the present disclosure relates to a gear reduction method for chain mooring windlasses that may include providing a first stage of gear reduction and a second stage of gear reduction. Both the first and second stages of gear reduction may be located between drive assemblies of a chain mooring windlass and a chain wheel of the chain mooring windlass.

Another embodiment of the present disclosure relates to an offshore vessel having a chain mooring windlass that has a two-stage gear reduction. The chain mooring windlass may include a windlass frame, which may be coupled to a portion of the offshore vessel. The chain mooring windlass may include a chain wheel and a chain wheel axel extending through the chain wheel and rotatably coupled to the windlass frame. Drive assemblies may be operatively coupled to the chain wheel axel via a first stage gear reduction including reduction gears. The chain wheel axel may be operatively coupled to the chain wheel via a second stage gear reduction including reduction gears.

Another embodiment of the present disclosure relates to a movable drive mechanism for driving chain mooring windlasses. The movable drive mechanism may include reduction gears, and drive assemblies operatively coupled to the reduction gears. The drive assemblies may operate to drive the reduction gears. A drive gear may be operatively coupled to the reduction gears. The reduction gears may operate to drive the drive gear. The drive gear may be configured to operatively couple to a chain wheel of a chain mooring windlass to drive the chain wheel. The movable drive mechanism may include a chain wheel coupler configured to selectively couple the movable drive mechanism to a chain wheel of a chain mooring windlass.

Another embodiment of the present disclosure relates to a single-drive method that includes using a single movable drive mechanism to selectively operate multiple chain mooring windlasses. The single-drive method may include providing a movable drive mechanism, coupling the movable drive mechanism with a first chain wheel assembly, and rotating a chain wheel of the first chain wheel assembly using the movable drive mechanism. The single-drive method may include decoupling the movable drive mechanism from the first chain wheel assembly, coupling the movable drive mechanism with a second chain wheel assembly, and rotating a chain wheel of the second chain wheel assembly using the movable drive mechanism.

Another embodiment of the present disclosure relates to an offshore vessel that includes multiple chain mooring windlasses, each chain mooring windlass having a chain wheel. A frame of each chain mooring windlasses may be coupled to a portion of the offshore vessel. The offshore vessel may include a movable drive mechanism configured to selectively couple to each of the chain mooring windlasses and to drive the chain wheels thereof. The movable drive mechanism may include reduction gears, and drive assemblies operatively coupled to the reduction gears. The drive assemblies may operate to drive the reduction gears. A drive gear may be operatively coupled to the reduction gears. The reduction gears may operate to drive the drive gear. The drive gear may be configured to operatively couple to a chain wheel of a chain mooring windlass to drive the chain wheel. The movable drive mechanism may include a chain wheel coupler configured to selectively couple the movable drive mechanism to a chain wheel of a chain mooring windlass.

Some embodiments relate to a chain mooring windlass including a windlass frame, a chain wheel, a chain wheel axel extending through and operatively coupled to the chain wheel and rotatably coupled to the windlass frame, and drive assemblies operatively coupled to the chain wheel axel. The chain mooring windlass also includes a chain stopper configured to selectively rotate into: an open configuration allowing passage of a chain through an opening formed by the chain stopper; and a closed configuration with the chain stopper gripping a chain positioned within the opening formed by the chain stopper. The chain mooring windlass with the chain stopper may be in a method of pulling-in, paying-out, positioning, or combination thereof a mooring line.

The foregoing has outlined rather broadly the features and technical advantages of the present disclosure in order that the detailed description that follows may be better understood. Additional features and advantages will be described hereinafter, which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure. The novel features which are believed to be characteristic of the products, systems, and methods, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

So that the manner in which the features and advantages of the system, products, and/or method so of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 15A is a cut-away, plan view of a planetary carrier in accordance with certain embodiments of the present disclosure.

FIG. 15B is a cut-away, side view of the planetary carrier of FIG. 15A with a manual shift mechanism in a fast/light mode in accordance with certain embodiments.

FIG. 15C is plan view of the manual shift mechanism of FIG. 15B in the fast/light mode.

Figure 1:
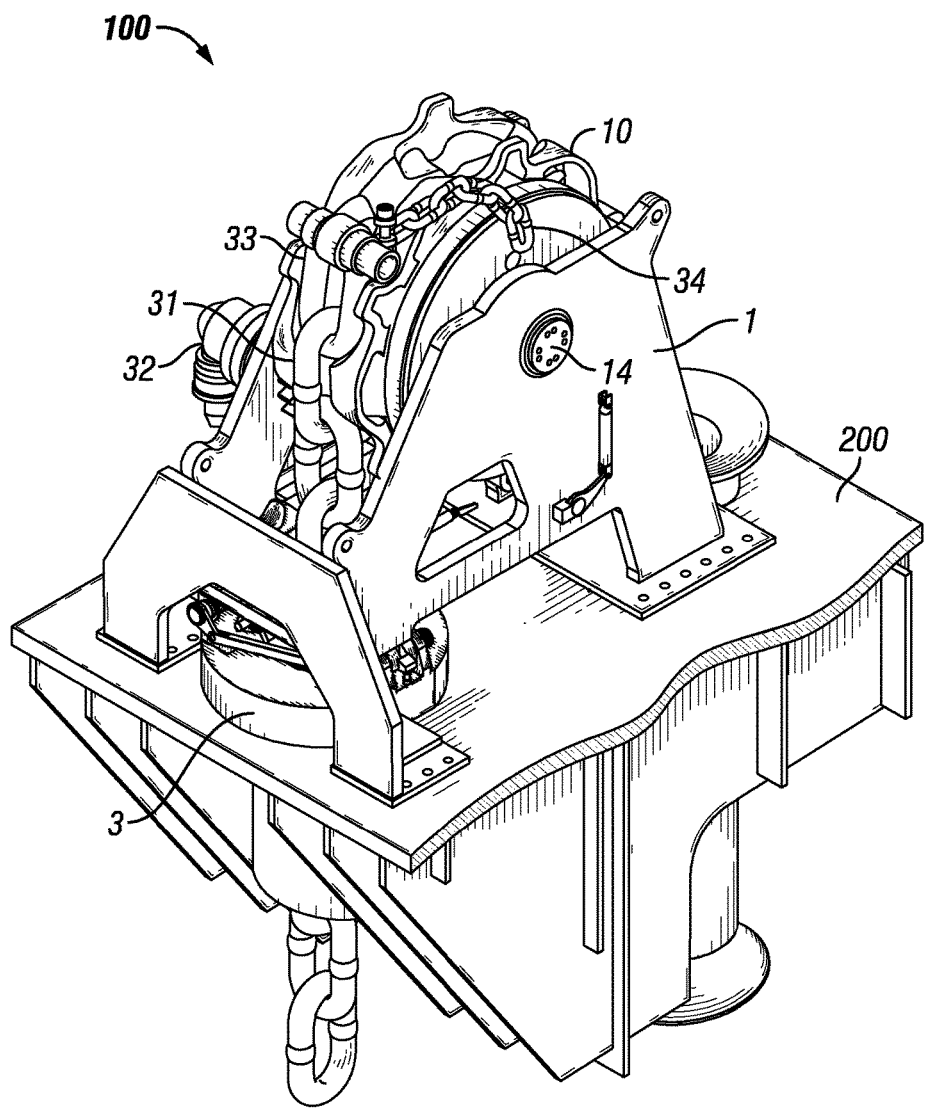
FIG. 1 is a perspective view of a dual chain mooring windlass in accordance with certain embodiments of the present disclosure.
Figure 2:
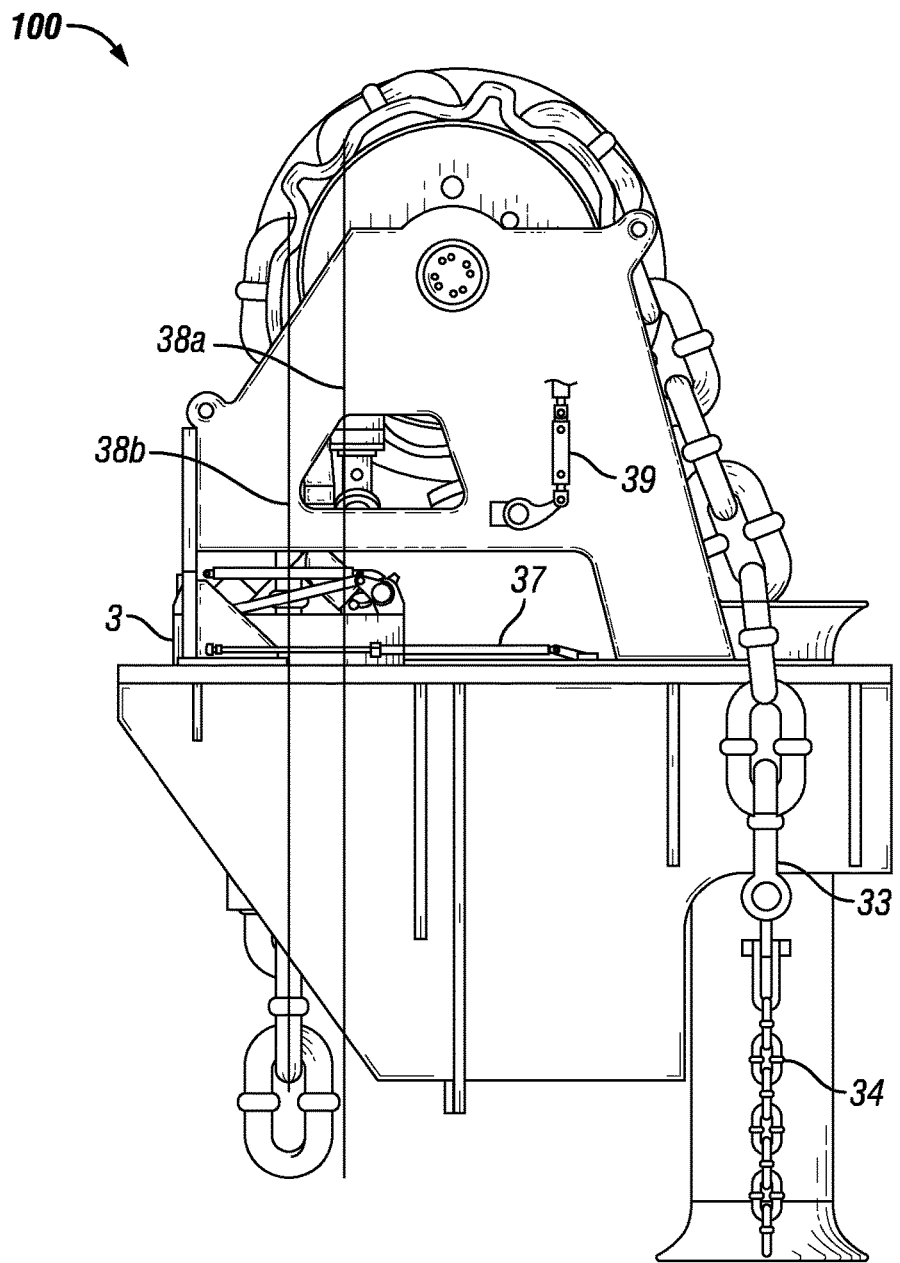
FIG. 2 is a side view of the dual chain mooring windlass of FIG. 1.

Products and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice. For example, many of the exemplary descriptions provided herein are concerned with training pants for infants and young children or diapers. Aspects of the concepts described may, however, be equally applicable to designs for and the manufacture of adult incontinence products and other similar products.

DETAILED DESCRIPTION

The foregoing has outlined rather broadly the features and technical advantages of the present disclosure in order that the detailed description that follows may be better understood. Additional features and advantages will be described hereinafter, which form the subject of the claims. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure. The novel features which are believed to be characteristic of the products, systems, and methods, both as to their organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Certain embodiments of the present disclosure include a chain mooring windlass having a movable (e.g., rotatable) chain stopper that includes two opposing stopper latches, and has an open "C" configuration. It is understood that the chain stopper may be the movable chain stopper disclosed in the figures or any of the chain stoppers disclosed in U.S. application Ser. No. 15/431,145, filed on Feb. 13, 2017, and U.S. application Ser. No. 15/603,293, filed on May 23, 2017, both of which are incorporated herein by reference.

One embodiment of the present disclosure relates to a chain mooring windlass with two stages of gear reduction, including embodiments with a shift mechanism and without a shift mechanism. Some embodiments disclosed herein relate to a movable drive mechanism for driving chain mooring windlasses. While these embodiments are separately described herein, one skilled in the art would understand that one or more of these embodiments may be combined. For example and without limitation, some embodiments may include a chain mooring windlass having a movable chain stopper and two stages of gear reduction. Additional embodiments may include a chain mooring windlass having two stages of gear reduction and a movable drive mechanism. While, still further embodiments may include a chain mooring windlass having a movable chain stopper, two stages of gear reduction, and a movable drive mechanism. Any of these embodiments or combinations of embodiments may be with or without a shift mechanism, as describe herein.

FIGS. 1-12 depict chain mooring windlass 100. Chain mooring windlass 100 includes chain wheel 10. As shown, chain wheel 10 is a dual chain wheel. The dual chain wheel may be one the same as or similar to the chain wheel disclosed in U.S. application Ser. No. 13/669,310, the entirety of which is incorporated herein by reference. In other embodiments, the chain wheel may be a single chain wheel. Dual chain wheel 10 is rotatably mounted onto windlass frame 1 via chain wheel axel 14. Chain wheel axel 14 extends through chain wheel 10, and is configured to rotate freely relative to frame 1. Dual chain wheel 10 is configured to rotate freely about chain wheel axel 14. Frame 1 is mounted to a portion of offshore vessel 200.

Chain mooring windlass 100 includes drive assembly 32. Drive assembly 32 is operatively coupled with chain wheel axel 14 via a first stage of gear reduction, including one or more reduction gears, which may be configured to rotate chain wheel axel 14. Chain wheel axel 14 may, in-turn, rotate reduction gears of a second stage of gear reduction. Reduction gears of the second stages of gear reduction may then rotate chain wheel 10, as described in more detail below. Rotation of chain wheel 10 hauls mooring chain 31 into or towards inboard hawse pipe 35 or deploy mooring chain 31 outboard through outboard hawse pipe 36, depending upon the direction of rotation of chain wheel 10. Drive assembly 32 may be an electric or hydraulic drive assembly. In some embodiments, drive assembly 32 may include a motor, gearbox, and pinion. Chain mooring windlass 100 includes chain wheel latch cylinder 39 configured to ratchetedly engage with chain wheel 10. In the embodiment shown in FIGS. 1-12, chain wheel latch cylinder 39 ratchetedly engages the chain wheel 10 with chain wheel latch 39a.

In some embodiments, mooring chain 31 may be a mechanically coupled with an anchor (not shown). Mooring chain 31 is coupled with shackle 33. In operation, shackle 33 is configured to engage with teeth of chain wheel 10. Shackle 33 may be a back to back shackle connector. Shackle 33 is coupled with messenger chain 34. In this manner, a continuous chain of two different chain sizes is formed.

In the embodiment show in FIGS. 1-12, the small wildcat profiles of chain wheel 10 are sized and configured to couple with messenger chain 34. The large wildcat profiles of chain wheel 10 are sized and configured to couple with mooring chain 31, as discussed in U.S. application Ser. No. 13/669,310. In operation, while messenger chain 34 is hauled in, mooring chain 31 may extend along chain line 38a, and while mooring chain 31 is hauled in, mooring chain 31 may extend along chain line 38b.

The chain mooring windlass 100 shown in FIGS. 1-12 includes chain stopper 3, which may be a rotatable stopper assembly. Chain stopper 3 includes stopper rotating cylinder 37 configured to selectively rotate chain stopper 3 into an open configuration allowing passage of messenger chain 34. Chain stopper 3 has a "C" shaped body with two opposing stopper latches 3a.

Figure 4:
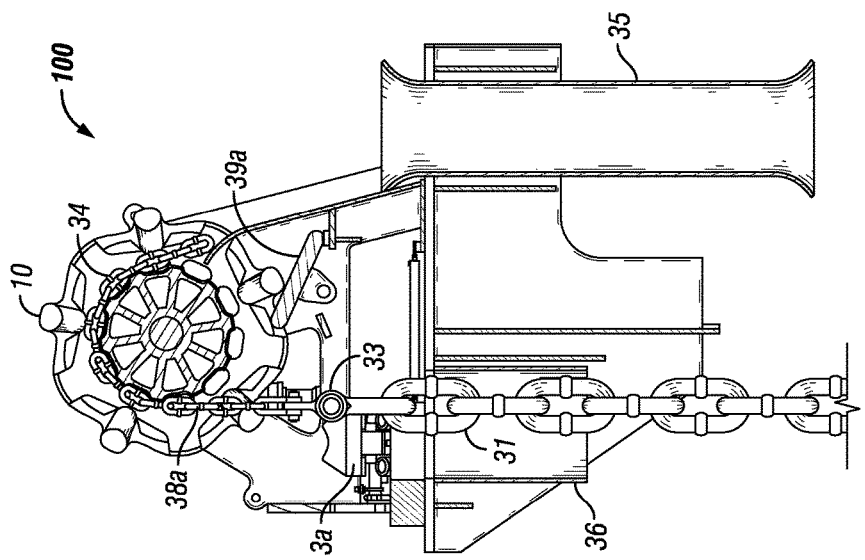
FIG. 4 is a cut-away, side view of the dual chain mooring windlass during haul-in of the messenger chain of FIG. 3.
Figure 3:
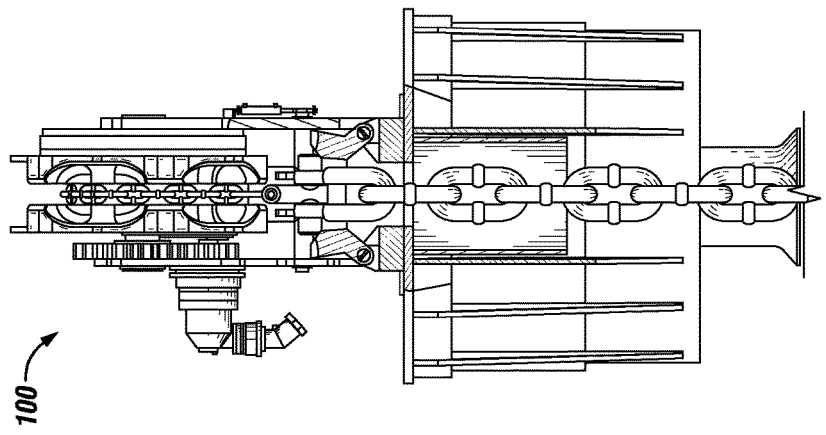
FIG. 3 is a cut-away, front view of a dual chain mooring windlass during haul-in of a messenger chain in accordance with certain embodiments of the present disclosure.

FIGS. 3-10 depict chain mooring windlass 100 in operation, in accordance with certain embodiments of the present disclosure. FIGS. 3 and 4 depict chain mooring windlass 100 during haul-in of messenger chain 34. During haul-in of messenger chain 34, chain stopper 3 is in the open position. When in the open position, as shown in FIGS. 3 and 4, chain line 38a passes inboard of stopper latches 3a, by way of the open side of the "C" shaped chain stopper 3. When chain line 38a is clear of chain stopper 3, messenger chain 34 and shackle 33 do not engage latches 3a or the body of chain stopper 3. In a preferred embodiment, when chain line 38a is clear of chain stopper 3, messenger chain 34 and shackle 33 do not engage or touch latches 3a or the body of chain stopper 3 as they are hauled in or payed out.

While the messenger chain 34 is being hauled in, chain wheel latch 39a, movable via chain wheel latch cylinder 39, may be positioned to engaged chain wheel 10. In some embodiments, chain wheel latch 39a ratchetedly engages chain wheel 10 as chain wheel 10 rotates. In the embodiment of FIG. 4, chain wheel 10 is rotated clockwise to haul-in messenger chain 34, shackle 33, and mooring chain 31.

Figure 6:
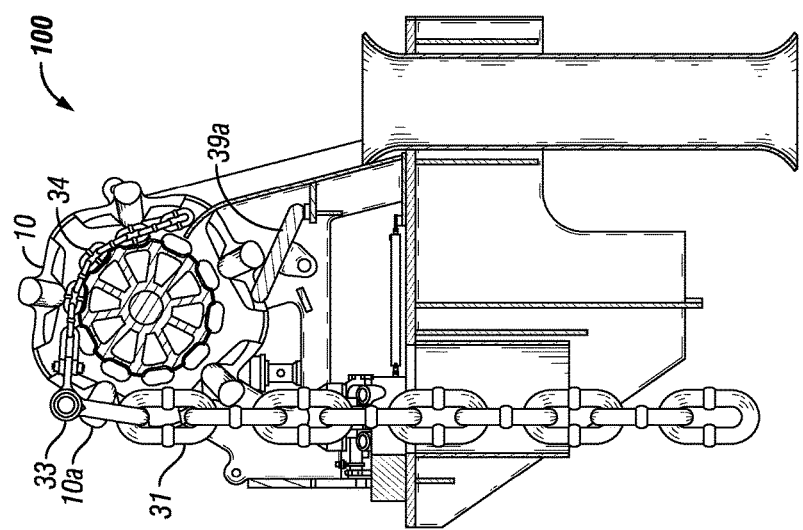
FIG. 6 is a cut-away, side view of the dual chain mooring windlass during transition from hauling in the messenger chain to hauling in the mooring chain of FIG. 5.
Figure 5:
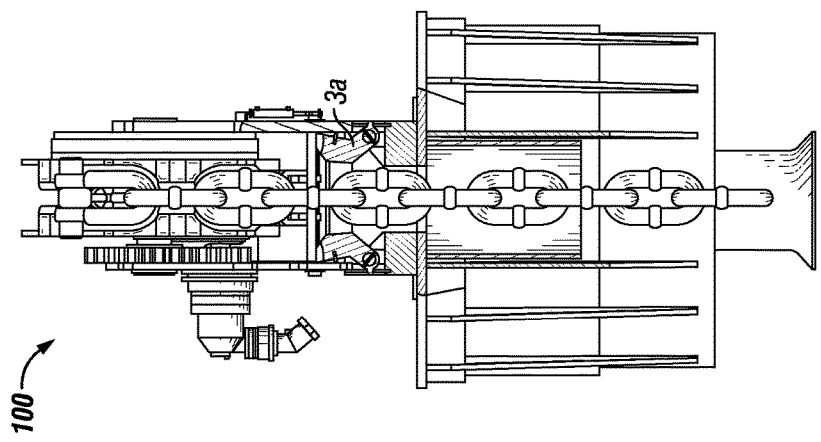
FIG. 5 is a cut-away, front view of a dual chain mooring windlass during transition from hauling in the messenger chain to hauling in a mooring chain in accordance with certain embodiments of the present disclosure.

FIGS. 5 and 6 depict chain mooring windlass 100 during transition from hauling in messenger chain 34, as shown in FIGS. 3 and 4, to hauling in and positioning mooring chain 31, as shown in FIGS. 5-10. During transition, shackle 33 engages tooth 10a of chain wheel 10. In some embodiments, chain wheel latch 39a ratchetedly engages chain wheel 10 during the transition.

During the transition, chain stopper 3 is in the open position to allow chain 31 to pass freely as chain 31 transitions from chain line 38a to chain line 38b.

FIGS. 7-10 depict top chain haul-in and positioning. During top chain haul-in, chain 31 is engaged with chain wheel 10, and chain 31 extends along chain line 38b. In the embodiment of FIGS. 7-10, chain stopper 3 is a rotatable chain stopper. The center of rotation is preferably a point located centrally between the two stopper latches 3a. In this manner, as chain stopper 3 rotates, the stopper latches 3a rotate about the center of rotation. In a preferred embodiment, chain line 38b runs through the center of rotation.

Figure 8:
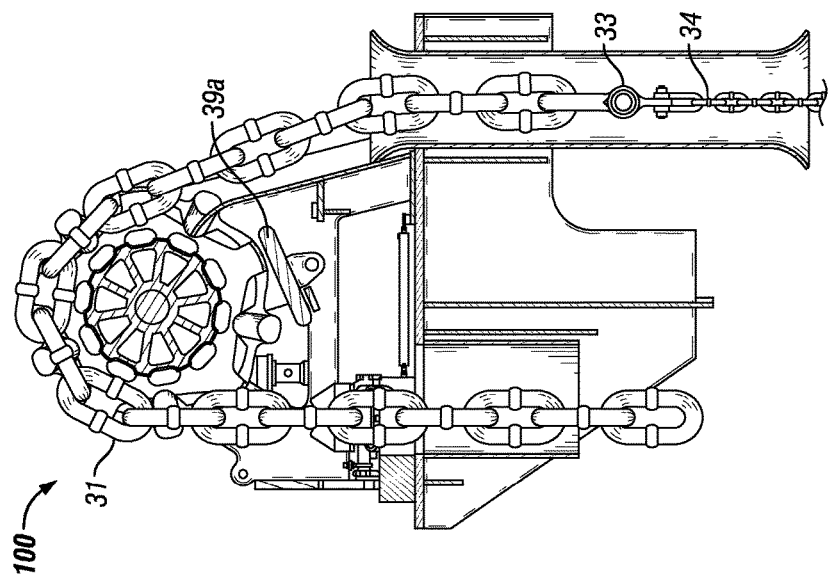
FIG. 8 is a cut-away, side view of the dual chain mooring windlass during haul-in of the mooring chain of FIG. 7.
Figure 7:
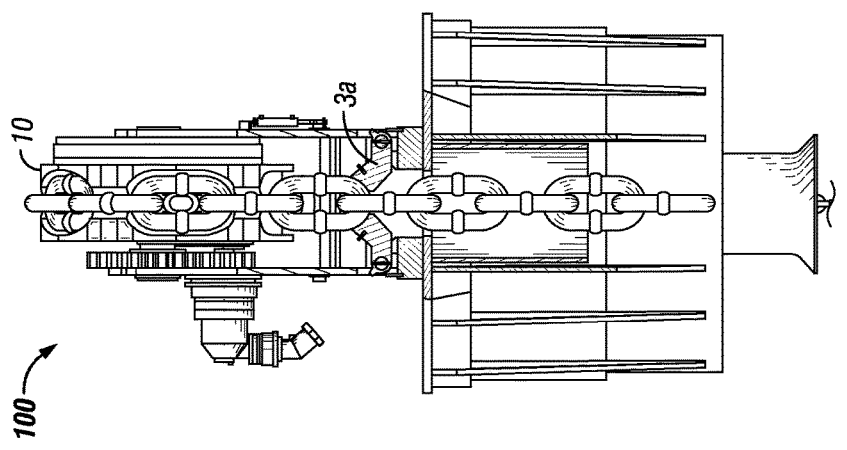
FIG. 7 is a cut-away, front view of a dual chain mooring windlass during haul-in of the mooring chain in accordance with certain embodiments of the present disclosure.
Figure 10:
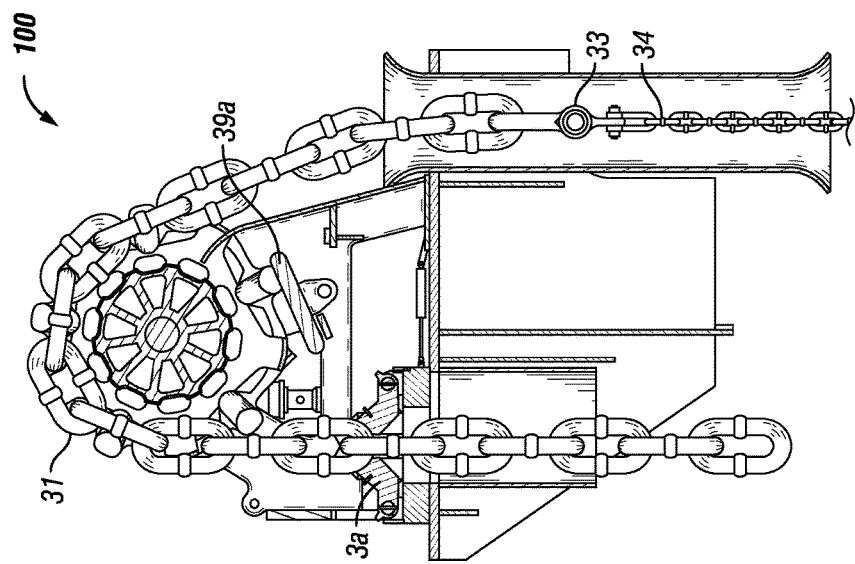
FIG. 10 is a cut-away, side view of the dual chain mooring windlass during positioning of the mooring chain of FIG. 9.
Figure 9:
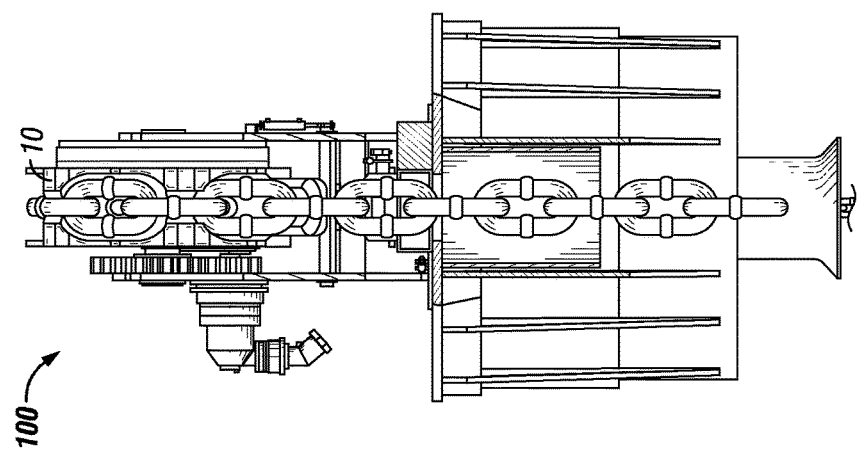
FIG. 9 is a cut-away, front view of a dual chain mooring windlass during positioning of the mooring chain in accordance with certain embodiments of the present disclosure.

During top chain haul-in, stopper latches 3a may be set to ratchetedly engage with links of mooring chain 31. In this manner, stopper latches 3a ratchet on the top part of alternating chain links. FIGS. 7 and 8 on the one hand, and FIGS. 9 and 10 on the other, show two positions in which stopper latches 3a can engage chain 31. To precisely position mooring chain 31, mooring chain 31 may be hauled in via rotating chain wheel 10. Once in position, chain stopper 3 is positioned such that latches 3a may engage with the link of chain 31 that minimizes the movement of chain 31 when chain 31 is set down upon, and in engagement with latches 3a. In operation, chain stopper 3 is rotated, such as by 90°, so that latches 3a may engage any link of mooring chain 31. As such, chain 31 can be more precisely positioned in that every link of chain 31 can be engaged instead of every other link. Latches 3a secure and maintain position of mooring chain 31. During top chain haul-in and precise positioning of mooring chain 31, chain wheel latch 39a may be disengaged from chain wheel 10.

Chain Mooring Windlass with Two Stages of Gear Reduction

Figures 11, 12:
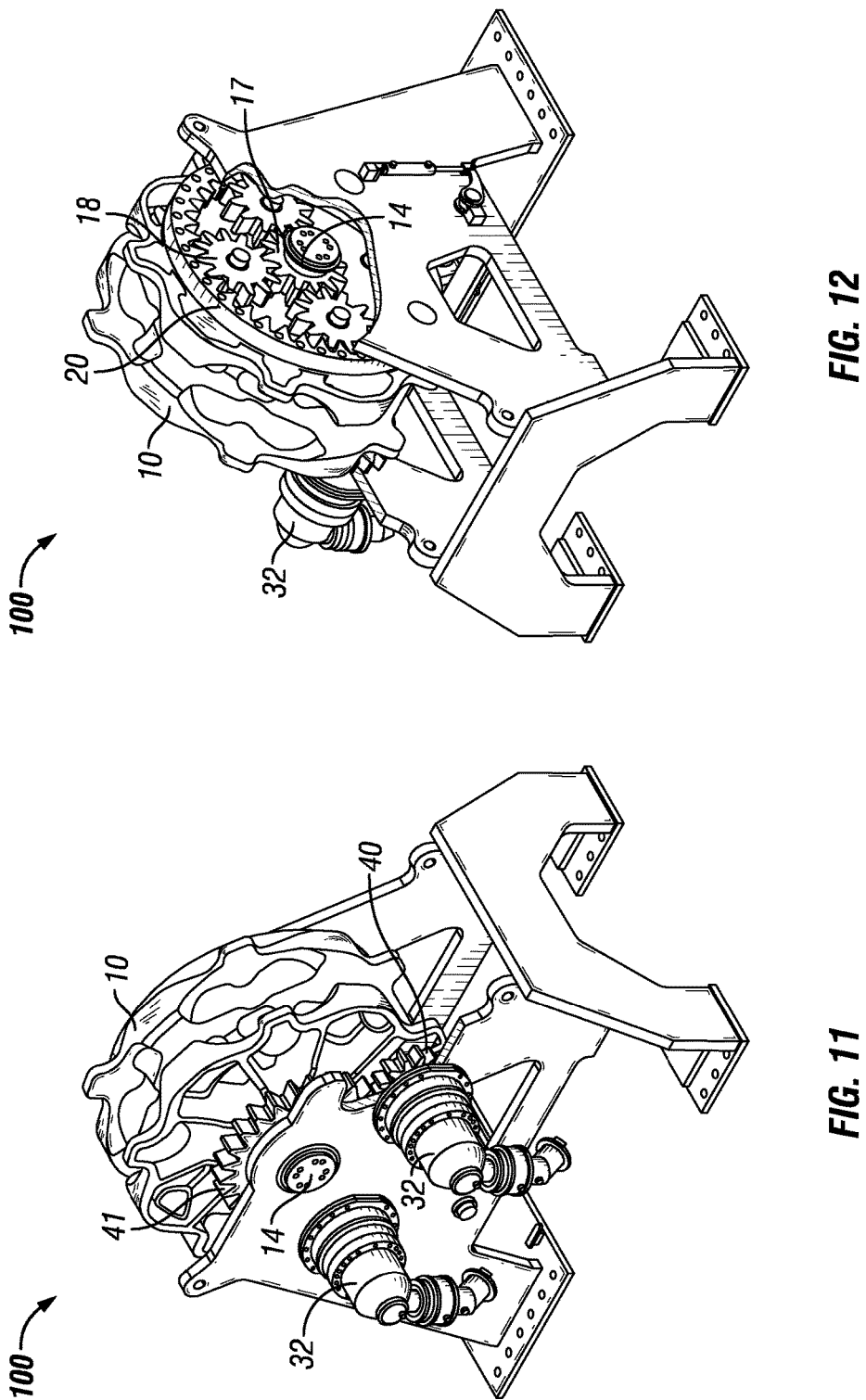
FIG. 11 is a cut-away, perspective view of a motor side of a dual chain mooring windlass having a two-stage gear reduction in accordance with certain embodiments.
FIG. 12 is a cut-away, perspective view of a non-motor side of the dual chain mooring windlass having a two-stage gear reduction of FIG. 11.

FIGS. 11 and 12 depict first and second stage gear reductions of chain mooring windlass 100. The first stage gear reduction is shown in FIG. 11, on a motor side of chain wheel 10. Reduction gears of the first stage of gear reduction includes pinion gears 40 and bull gear 41. Drive assemblies 32 are operatively coupled to pinion gears 40, pinion gears 40 are operatively coupled to bull gear 41, and bull gear 41 is operatively coupled to (e.g., fixed to) chain wheel axel 14. In operation, drive assemblies 32 operate to rotate pinion gears 40, rotation of pinion gears 40 rotates bull gear 41, and rotation of bull gear 41 rotates chain wheel axel 14. In some embodiments, the pitch diameter of pinion gears 40 is less than the pitch diameter of bull gear 41. In certain embodiments, the pitch diameter of pinion gears 40 is half or less than the pitch diameter of bull gear 41.

In operation, chain wheel axle 14 rotates with bull gear 41. In certain embodiments, bull gear 41 is fixed to chain wheel axle 14 such that both bull gear 41 and chain wheel axel 14 rotate at the same rate. In other embodiments, bull gear 41 and chain wheel axel 14 rotate at different rates. While shown and described as including bull gear 41 and pinion gears 40, the first stage gear reduction is not limited to this particular embodiment, and may be any arrangement of gears configured to provide gear reduction.

FIG. 12 depicts the second stage gear reduction on a non-motor side of chain wheel 10. Reduction gears of the second stage gear reduction include sun gear 17, planetary gears 18, and internal ring gear 20. Chain mooring windlass 100 includes a planetary gearbox, including internal ring gear 20, which may be fixed to chain wheel 10. In some embodiments, chain wheel 10 and internal ring gear 20 rotate at the same rate. In other embodiments, chain wheel 10 and internal ring gear 20 rotate at different rates.

The planetary gearbox includes sun gear 17 and one or more planetary gears 18. The planetary gearbox includes four planetary gears 18, as shown. In other embodiments, the planetary gearbox may include more or less than four planetary gears 18. For example and without limitation, the planetary gearbox may include two, three, or more than four planetary gears 18. In certain embodiments, each planetary gear 18 may be configured to share tooth loading equally. In some embodiments, planetary gears 18 are lockable with respect to internal ring gear 20. In operation, planetary gears 18 may function as idlers.

Sun gear 17 is fixed to chain wheel axle 14. In operation, sun gear 17 rotates with chain wheel axle 14. The rate at which sun gear 17 rotates may be related to the speed of the motors of drive assembly 32 and the pitch diameter of pinion gears 40 relative to the pitch diameter of bull gear 41. For example and without limitation, in some embodiments, every 360° rotation of pinion gears 40 may rotate bull gear 41 by 90°, which, in-turn, may rotate chain wheel axel 14 and sun gear 17. In some embodiments, sun gear 17 has the same pitch diameter as planetary gears 18. In other embodiments, sun gear 17 has a different pitch diameter than that of planetary gears 18. While shown and described as including sun gear 17 and planetary gears 18, the second stage gear reduction is not limited to this particular embodiment, and may be any arrangement of gears configured to provide gear reduction.

While the first and second gear reductions are shown on opposite sides of chain wheel 10, in FIGS. 11 and 12, one skilled in the art would appreciate that both of the first and second gear reductions could be on the same side of chain wheel 10. Alternatively, a single stage gear reduction is also possible. For embodiments with one gear reduction, the gear reduction can be positioned on the motor or non-motor side.

In operation, the total gear reduction may be optimally configured according to the expected chain loads and drive assemblies 32 used. In some embodiments, drive assemblies 32 include hydraulic or electrical motors. While shown as including two drive assemblies 32, chain mooring windlass 100 may include more or less than two drive assemblies 32.

Figure 13B:
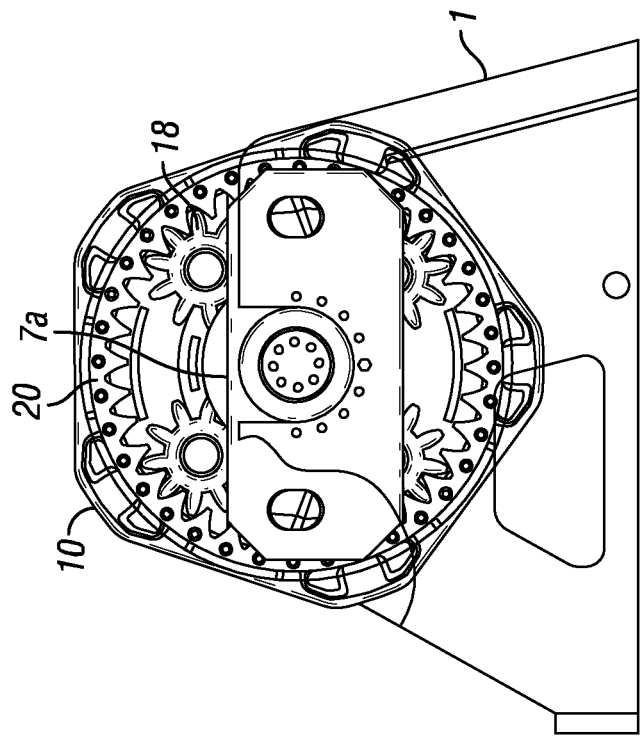
FIG. 13B is another cut-away, plan view of the embodiment of FIG. 15A.
Figure 13A:
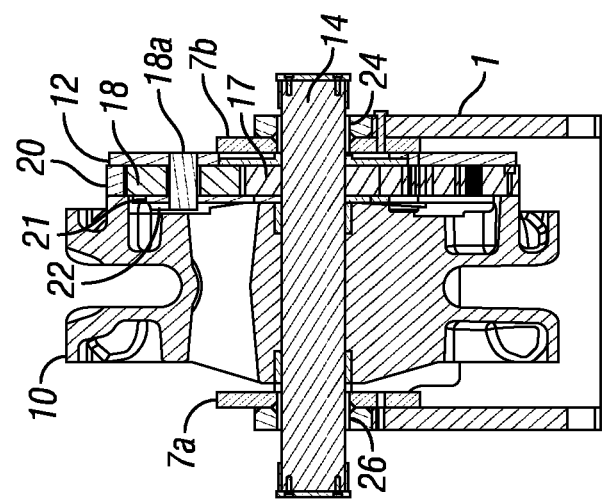
FIG. 13A is a cut-away, side view of an embodiment of a mooring windlass having a two-stage gear reduction
Figure 14B:
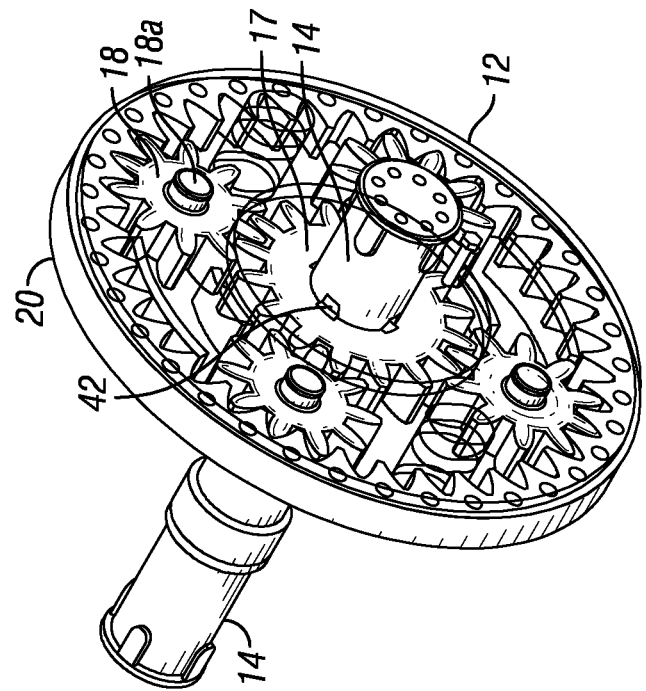
FIG. 14B is another cut-away, perspective view of the planetary carrier assembly of FIG. 14A.
Figure 14A:
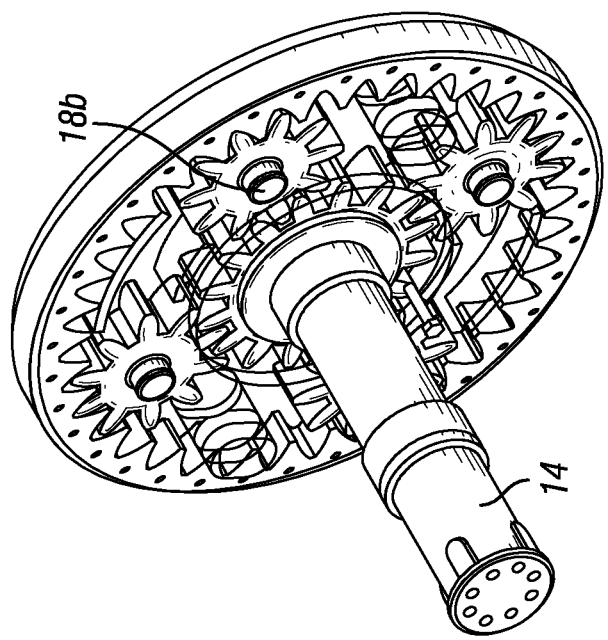
FIG. 14A is a cut-away, perspective view of a planetary carrier assembly in accordance with certain embodiments.

FIGS. 13A and 13B provide additional detail on the planetary gears that can be used in a gear reduction. In the embodiment of FIGS. 13A and 13B, the first stage gear reduction on the motor side (see FIG. 12) is not shown. One skilled in the art understands that alternative embodiments are envisioned that only have one gear reduction. FIGS. 14A and 14B depict the planetary carrier assembly of FIGS. 13A and 13B. The embodiments include planetary gear pins 18a, which may be permanent, and fixed holding plates 7a and 7b. Planetary gears 18 are mounted on planetary gear pins 18a. Planetary gear pins 18a are mounted to outer plate 12 and retained thereto, such as via planetary gear pin retainers 18b. Fixed holding plates 7a and 7b are mounted onto frame 1 and rigidly connected thereto. In operation, fixed holding plate 7a may react bearing load from chain wheel axel 14, and fixed holding plate 7b may react baring load from chain wheel axel 14 and torsion from outer plate 12. In certain embodiments, sun gear 17 includes sun gear drive key 42 affixing sun gear 17 to chain wheel axel 14. Inner plate 21 and outer plate 12 may function as planetary carriers. Chain wheel axel 14 includes one or more bearings, including chain wheel axel sleeve bearing 24 and chain wheel axel sleeve bearing 26. An adapter plate 22 is fixed to chain wheel 10.

Shift Mechanism

With reference to FIGS. 15A-15C, in some embodiments, operation of planetary gearbox 300 is selectable by way of shift mechanism 400. In operation, shift mechanism 400 may allow an operator to manage the rotational speed of chain wheel 10 relative to the load on chain wheel 10. In certain embodiments, shift mechanism 400 may be infrequently used. In other embodiments, shift mechanism 400 may be frequently used. In some embodiments, shift mechanism 400 may be a manual shift design (as shown). In other embodiments, shift mechanism 400 may be an automatic shift design (not shown).

Shift mechanism 400 is shown in FIGS. 5A-15C in a fast/light mode configured for high speed/low torque operation.

Internal ring gear 20 may be bolted or otherwise fixed to chain wheel 10. Sun gear 17 may be rigidly connected to chain wheel axle 14, such as via center gear key 16. Crank arm key 15 is engaged with end cap 28 of chain wheel axel 14. The assembly of planetary gear box 300, chain wheel 10, and chain wheel axel 14 includes one or more bearings, including chain wheel axel sleeve bearing 24, chain wheel axel sleeve bearing 26, chain wheel axel thrust bearing 27, and outer plate sleeve bearing 25. Planetary gearbox 300 also includes planetary gear sleeve bearing 19.

Planetary gears 18 are each supported by one of plungers 11, by inner plate 21, and by outer plate 12. Each plunger 11 is retained by plunger retainer 13, and may be biased via spring 23. Inner plate 21 and outer plate 12 may function as planetary carriers.

Figure 17A:
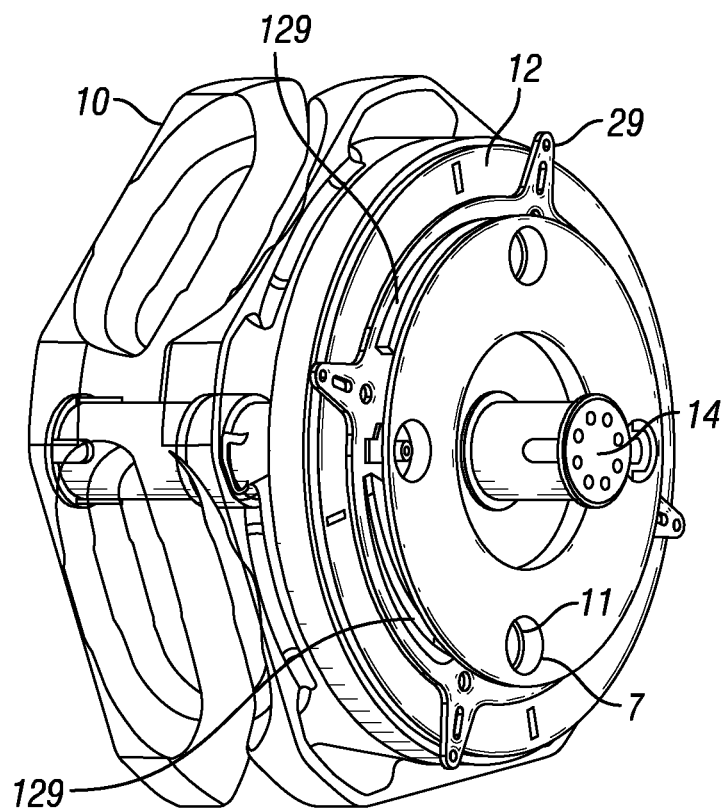
FIG. 17A is a perspective view showing a plunger fully engaged in a driving plate and fully disengaged from a fixed holding plate, during fast mode operation.
Figure 17C:
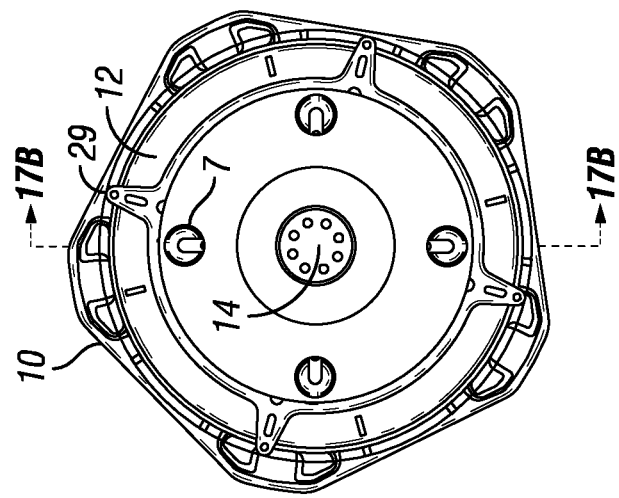
FIG. 17C is a plan view of the shifting mechanism during the fast mode operation of FIGS. 17A and 17B.
Figure 17B:
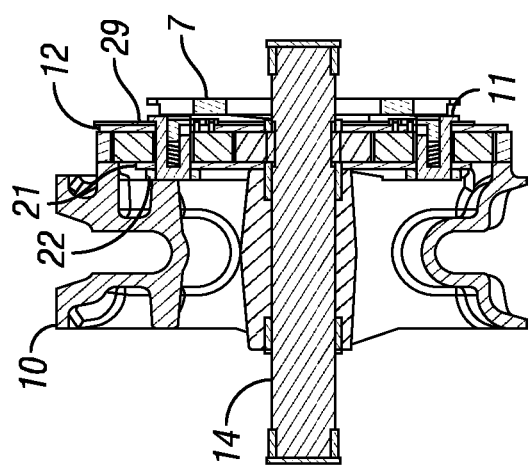
FIG. 17B is a cut-away, side view showing the plunger fully engaged in the driving plate and fully disengaged from the fixed holding plate, during the fast mode operation of FIG. 17A.

Each plunger 11 may be configured to move with respect to chain wheel 10. Plungers 11 may be movable between a first position in engagement with chain wheel 10, and a second position clear of (i.e., not in engagement with) chain wheel 10. In the embodiment of FIGS. 17A-17C, spring 23 biases plunger 11 into engagement with chain wheel 10. In operation, at least one planetary gear 18 rotates about each plunger 11 when the plungers 11 are clear of chain wheel 10.

Shift mechanism 400 includes shift ring 29. Shift ring 29 may be overlaid on the outside of outer plate 12. In operation, shift ring 29 may be manually rotated to move plungers 11 into and out of engagement with either chain wheel 10 or fixed holding plate 7. Shift ring 29 may be rotated in ways other than the manual configuration of FIGS. 15A-15C. For example, shift ring 29 may be shifted electronically, hydraulically, or other means know to those skilled in the art.

Planetary gearbox 300 can be configured for high speed/low torque operations forcing chain wheel axle 14 and chain wheel 10 to rotate together at the same rate. In the embodiment of FIGS. 15A-15C, this is done by positioning plungers 11 in the holes in adapter plate 22. Adapter plate 22 is fixed to chain wheel 10. Once plungers 11 are positioned in the holes in adapter plate 22, plungers 11, adapter plate 22, chain wheel axle 14, and chain wheel 10 rotate together at the same rate. As such, planetary gears 18, plungers 11, and inner and outer plates 21 and 12 rotate with chain wheel 10, resulting in a one-to-one revolutions per minute (rpm) ratio from chain wheel axel 14 to chain wheel 10 in the same direction.

Figure 16C:
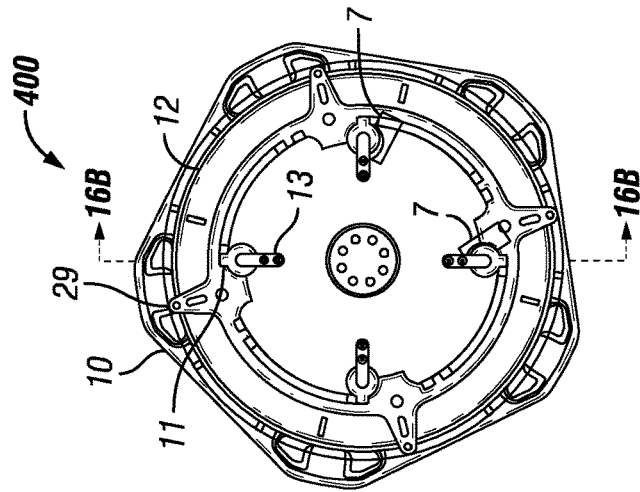
FIG. 16C is plan view of the manual shift mechanism of FIG. 16B in the slow/heavy mode.
Figure 16B:
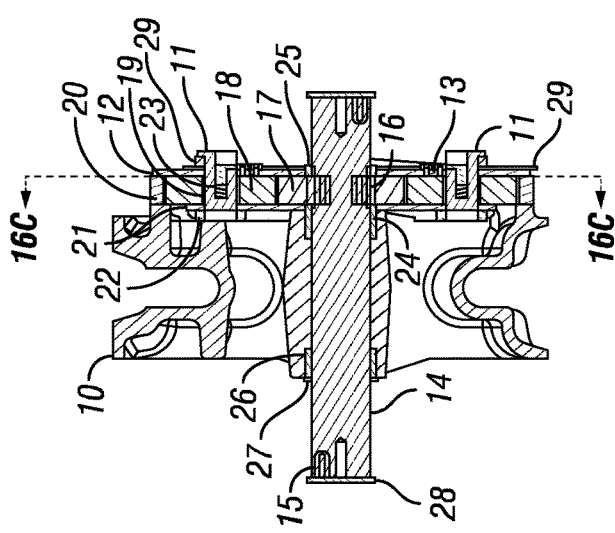
FIG. 16B is a cut-away, side view of the planetary carrier of FIG. 16A with the manual shift mechanism in a slow/heavy mode in accordance with certain embodiments.
Figure 16A:
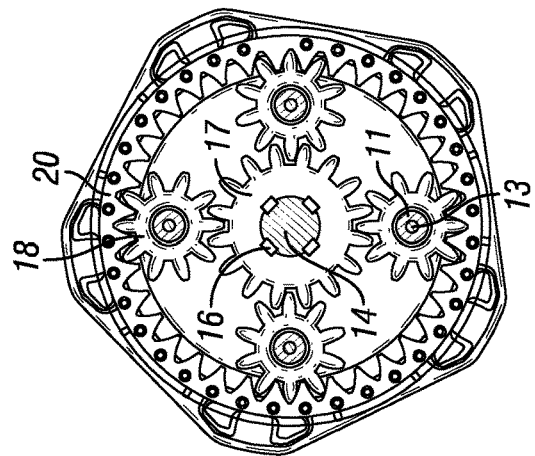
FIG. 16A is a cut-away, plan view of a planetary carrier in accordance with certain embodiments of the present disclosure.

Planetary gearbox 300 can be configured for low speed/high torque operations by allowing chain wheel axle 14 and chain wheel 10 to rotate at different rates. In the embodiment of FIGS. 16A-16C, this is done by retracting plungers 11 out of the holes in adapter plate 22. Once plungers 11 are retracted from the holes in adapter plate 22, plungers 11 move relative to chain wheel 10, allowing chain wheel axle 14 and chain wheel 10 to rotate at different rates. In such a configuration, each planetary gear 18 is free to rotate about its own axis, thereby transferring power from sun gear 17 to internal ring gear 20 in reverse direction.

The embodiments of FIGS. 15A-20C can be moved between high speed/low torque mode and low speed/high torque mode using shift ring 29. Shift ring 29 includes wedge surfaces 129 that are in sliding engagement with plungers 11 to wedge them from the holes in adapter plate 22. In the high speed/low torque mode, plungers 11 are fully extended into the holes in adapter plate 22. In one embodiment, springs 23 bias plungers 11 into the holes. As shift ring 29 is rotated, wedge surfaces 129 slide under edges of plungers 11. As shift ring 29 is rotated further, wedge surfaces 129 wedge plungers 11 from the holes in adapter plate 22. In some embodiments, fixed holding plate 7 may be rigidly connected to frame 1, thereby fixing plungers 11, inner plate 21, and outer plate 12 relative to frame 1.

In some embodiments, the diameter ratio of internal ring gear 20 to sun gear 17 may be, for example, 2:1. In such embodiments, chain wheel 10 will be driven twice as fast and with half the capacity in the high speed/low torque mode when compared to the low speed/high torque mode for a given chain wheel axel 14 speed. One skilled in the art would appreciate that the torque/speed relationships between high and low gears may be varied in the design to achieve ratios advantageous to particular applications.

FIGS. 17A-220C depict plungers 11 in various configurations during operation. In FIGS. 17A-17C, plungers 11 are fully engaged in the holes in adapter plate 22 for fast mode operation.

Figure 18A:
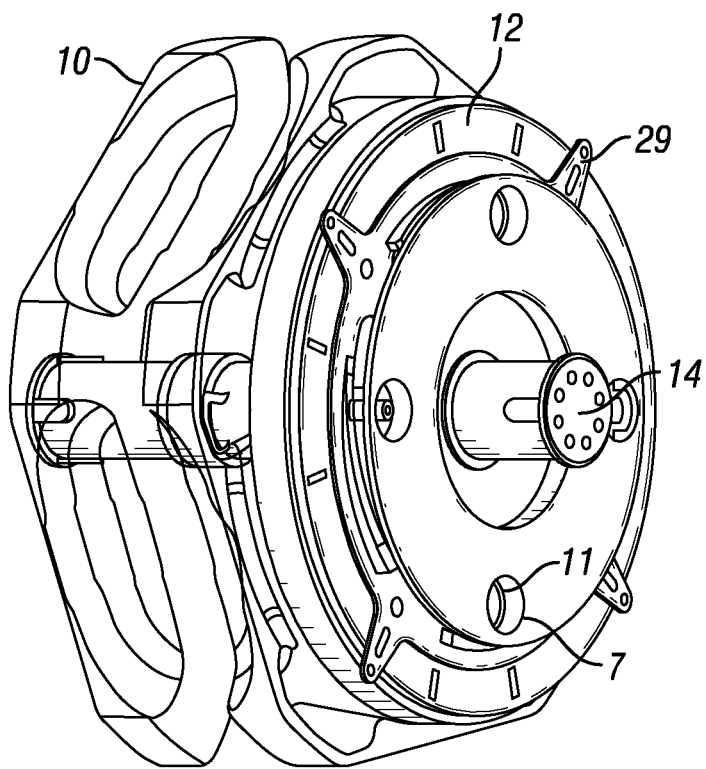
FIG. 18A is a perspective view showing the plunger partially retracted from the driving plate and partially engaged in the fixed holding plate, during transition from fast mode operation to slow mode operation.
Figure 18C:
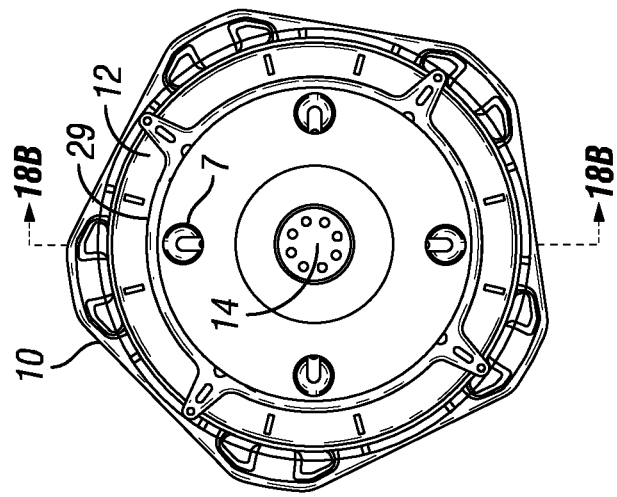
FIG. 18C is a plan view of the shifting mechanism during the transition of FIGS. 18A and 18B.
Figure 18B:
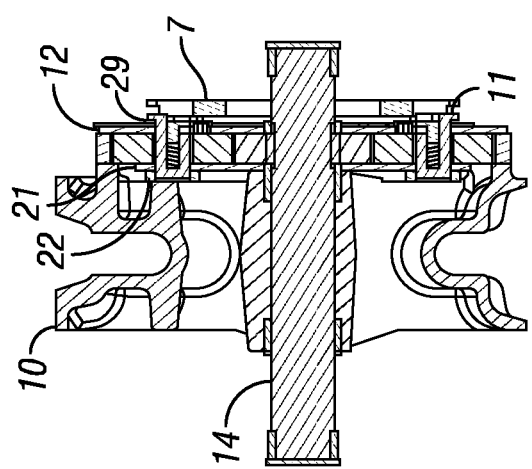
FIG. 18B is a cut-away, side view showing the plunger partially retracted from the driving plate and partially engaged in the fixed holding plate, during transition from fast mode operation to slow mode operation of FIG. 18A.
Figure 20A:
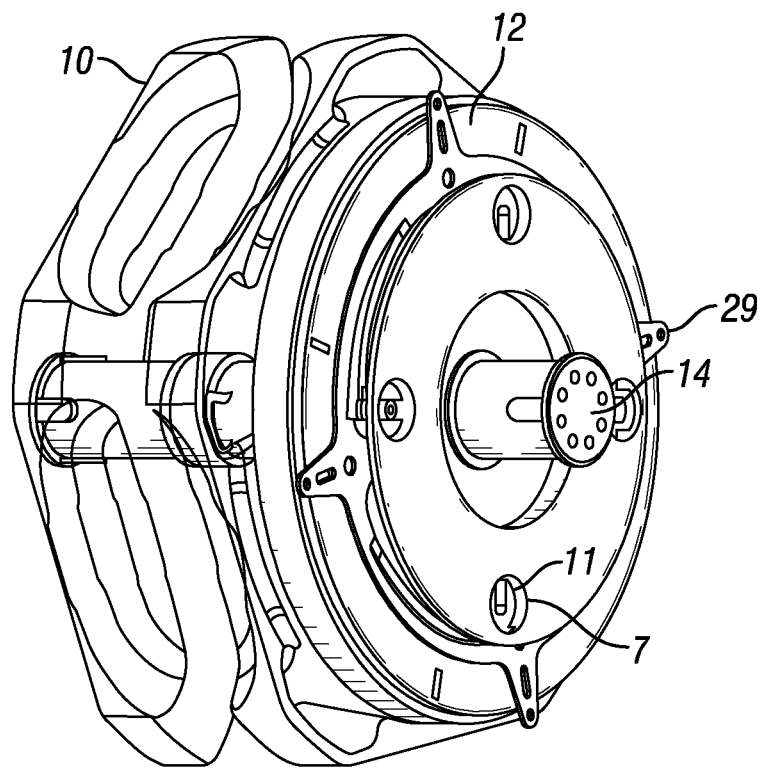
FIG. 20A is a perspective view showing the plunger fully disengaged from the driving plate and fully engaged in the fixed holding plate, during slow mode operation.
Figure 20C:
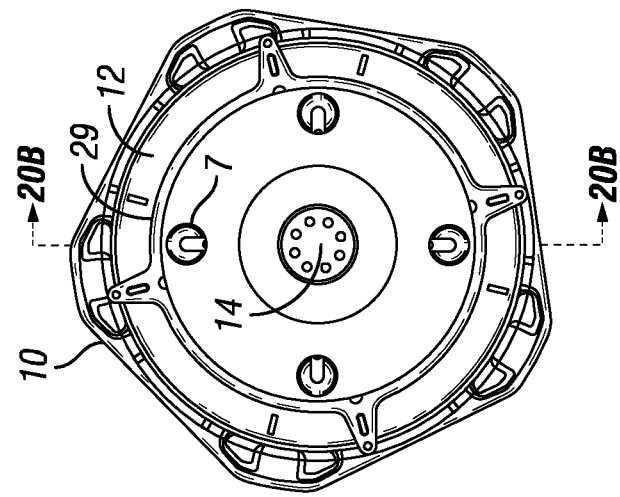
FIG. 20C is a plan view of the shifting mechanism during the transition of FIGS. 20A and 20B.
Figure 20B:
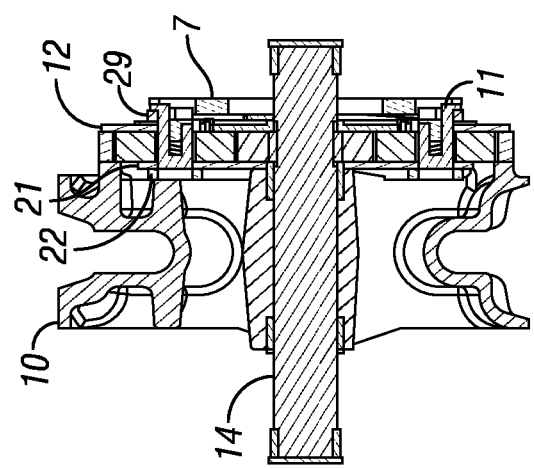
FIG. 20B is a cut-away, side view showing the plunger fully disengaged from the driving plate and fully engaged in the fixed holding plate, during slow mode operation of FIG. 01A.

In FIGS. 18A-18C, chain wheel 10 is in transition from the fast mode (FIGS. 17A-17D) to the slow mode (FIGS. 20A-20C). Plungers 11 are partially retracted (about ⅓ of the way) from the holes in adapter plate 22.

Figure 19A:
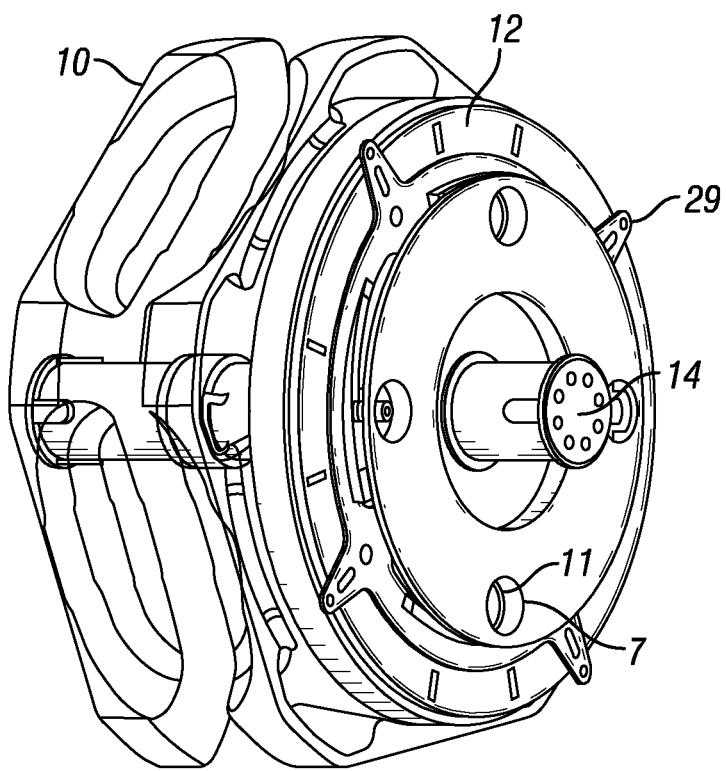
FIG. 19A is a perspective view showing the plunger further retracted from the driving plate and further engaged in the fixed holding plate relative to FIG. 19A, during transition from fast mode operation to slow mode operation.
Figure 19C:
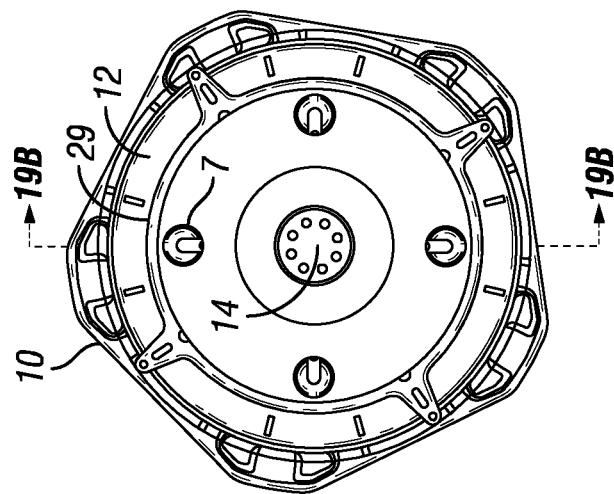
FIG. 19C is a plan view of the shifting mechanism during the transition of FIGS. 19A and 19B.
Figure 19B:
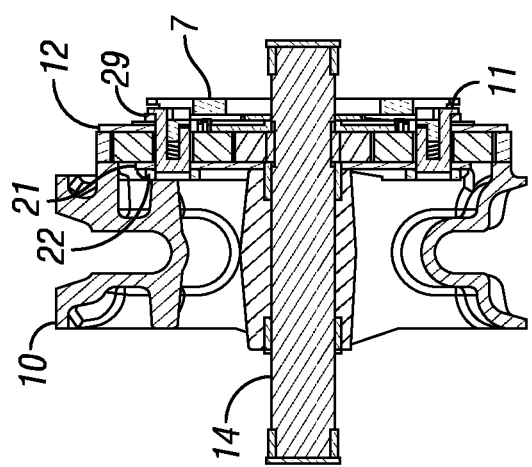
FIG. 19B is a cut-away, side view showing the plunger further retracted from the driving plate and further engaged in the fixed holding plate relative to FIG. 18B, during transition from fast mode operation to slow mode operation of FIGS. 21A.

In FIGS. 19A-19C, chain wheel 10 is further along the transition from the fast mode to the slow mode. Plungers 11 are mostly retracted (about ⅔ of the way) from the holes in adapter plate 22.

In FIGS. 20A-20C, chain wheel 10 is in slow mode. Plungers 11 are fully disengaged (retracted) from the holes in adapter plate 22.

Movable Drive Mechanism

The present disclosure also relates to a movable drive mechanism for driving chain mooring windlasses, embodiments of which are depicted and described with reference to FIGS. 21A-24B. In FIGS. 21A-24B, like reference numerals relative to those in FIGS. 1-20C are used to describe like elements.

Figure 21A:
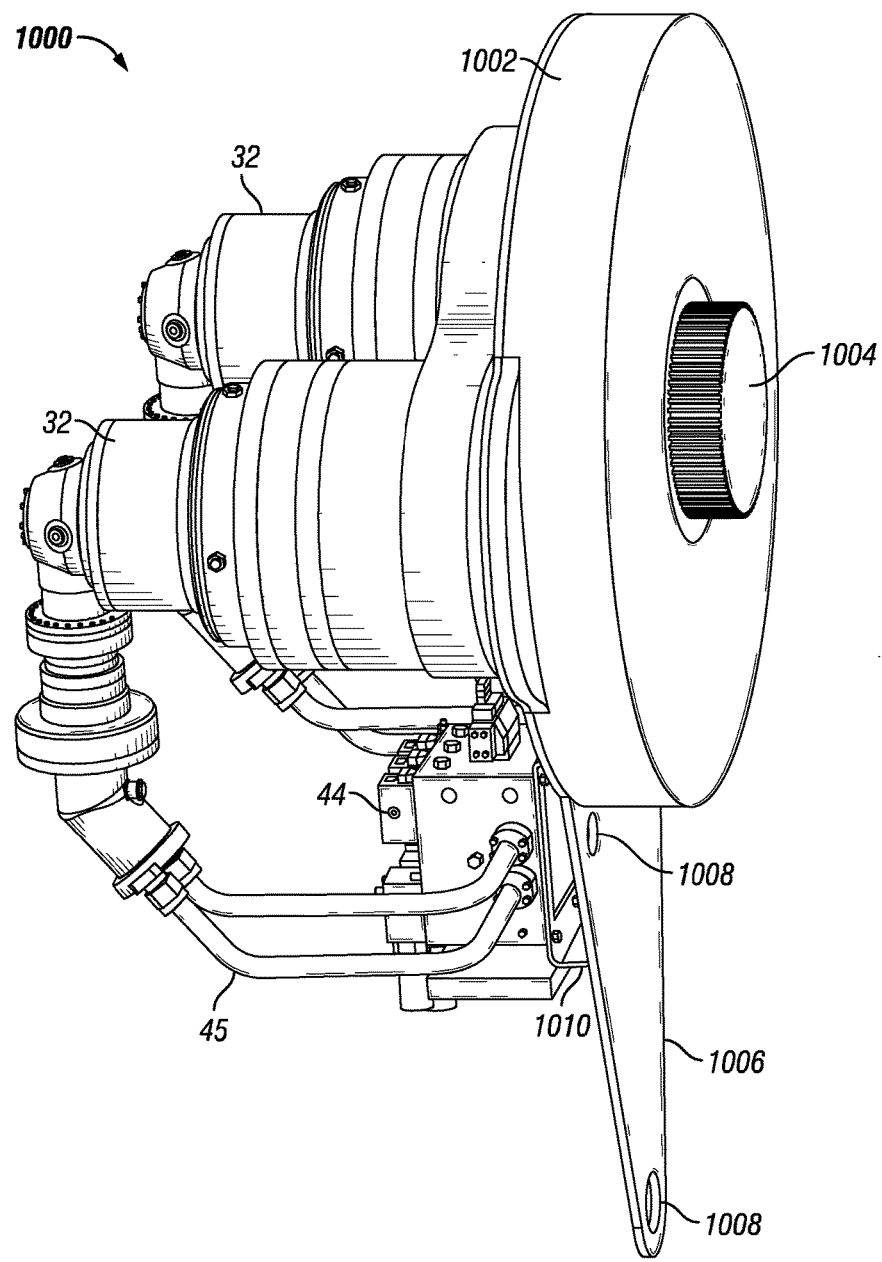
FIGS. 21A and 21B are perspective views of a movable drive mechanism in accordance with certain embodiments of the present disclosure.
Figure 21B:
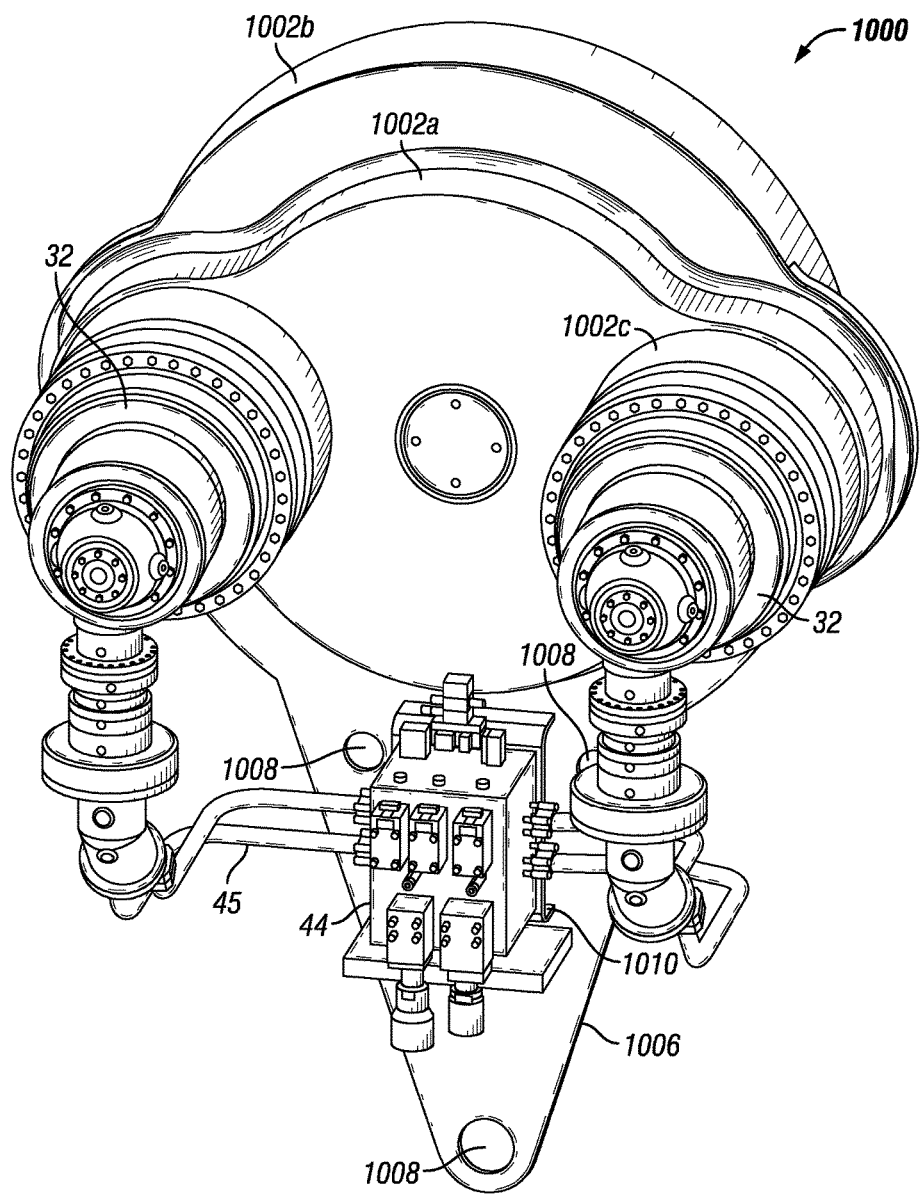

With reference to FIGS. 21A and 21B, movable drive mechanism 1000 includes one or more drive assemblies 32. Drive assemblies 32 are operatively connected with controller 44, such as via conduits 45. Controller 44 may function to control operation of drive assemblies 32. As discussed elsewhere herein, drive assemblies 32 may be hydraulic drive assemblies, including hydraulic motors. In such embodiments, conduits 45 may carry hydraulic fluid to and from drive assemblies 32 for operation thereof.

Movable drive mechanism 1000 includes housing 1002. Housing 1002 may be a steel housing containing one or more gear reduction stages, such as first and second gear reduction stages, as described in more detail below. For example, housing 1002 may include first housing section 1002*a* containing a first gear reduction stage, and second housing section 1002*b* containing a second gear reduction stage. Housing 1002 may also include third housing section 1002*c* configured to couple to drive assemblies 32. Controller 44 may be coupled to housing 1002, such as via controller bracket 1010. In operation, as described in more detail below, operation of drive assemblies 32 ultimately results in rotation of drive gear 1004 of movable drive mechanism 1000.

Movable drive mechanism 1000 includes chain wheel coupler 1006. Chain wheel coupler 1006 may be any structure, static or mechanical, configured to mechanically couple movable drive mechanism 1000 to a chain mooring windlass, as shown and described in more detail below. For example, chain wheel coupler 1006 may be a plate or bracket, coupled to or integral with housing 1002, including one or more pin holes 1008. In operation of such embodiments, one or more portions of a chain mooring windlass may be coupled within pin holes 1008 of chain wheel coupler 1006, as described in more detail below. While shown and described as a plate having pin holes, one skilled in the art would understand that chain wheel coupler 1006 may be any structure, static or mechanical, configured to mechanically couple movable drive mechanism 1000 to a chain mooring windlass.

Figure 22A:
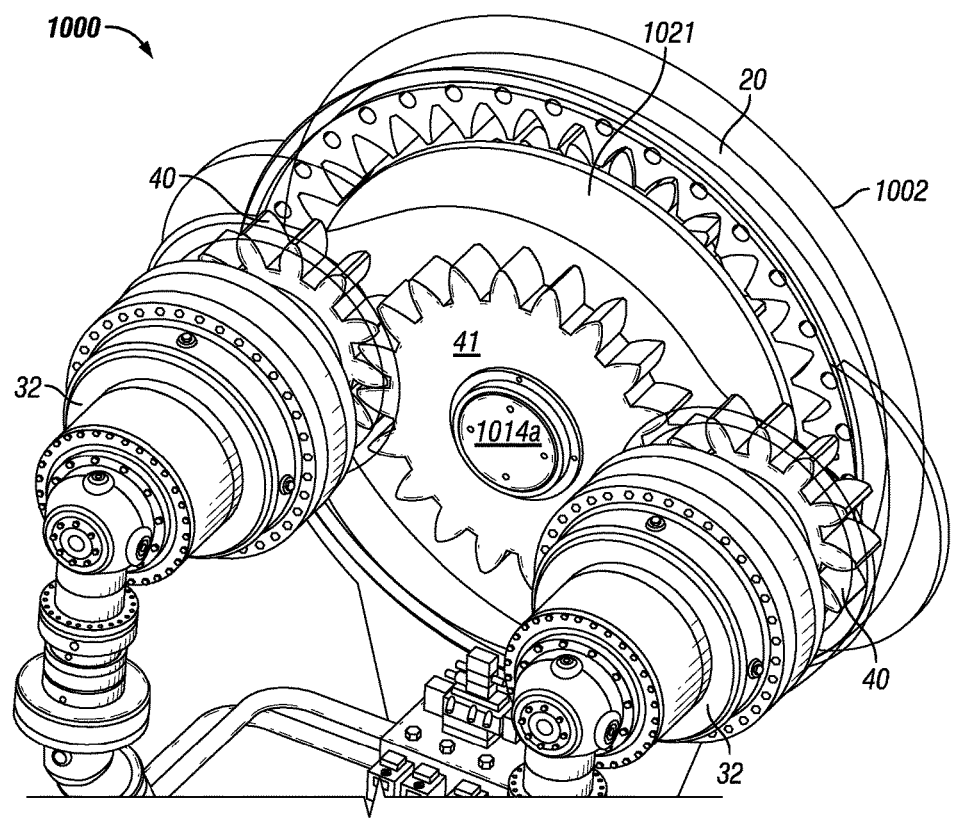
FIGS. 22A-22D are cut-away views that depict gears of the movable drive mechanism in accordance with certain embodiments of the present disclosure.

FIGS. 22A-22D are views depicting the first and second stages of gear reduction of movable drive mechanism 1000. The first stage of gear reduction is shown in FIG. 22A. Each drive assembly 32 may be mechanically coupled to housing 1002, and operatively coupled to one of pinion gears 40. Each pinion gear 40 may be operatively coupled to bull gear 41, and bull gear 41 may be operatively coupled to (e.g., affixed thereto) motor side of axel 1014*a*. Drive assemblies 32, pinion gears 40, and bull gear 41 may be located on a motor side of inner plate 1021 of movable drive mechanism 1000. In operation, drive assemblies 32 rotate pinion gears 40, rotation of pinion gears 40 rotates bull gear 41, and rotation of bull gear 41 rotates axel 1014.

Figure 22B:
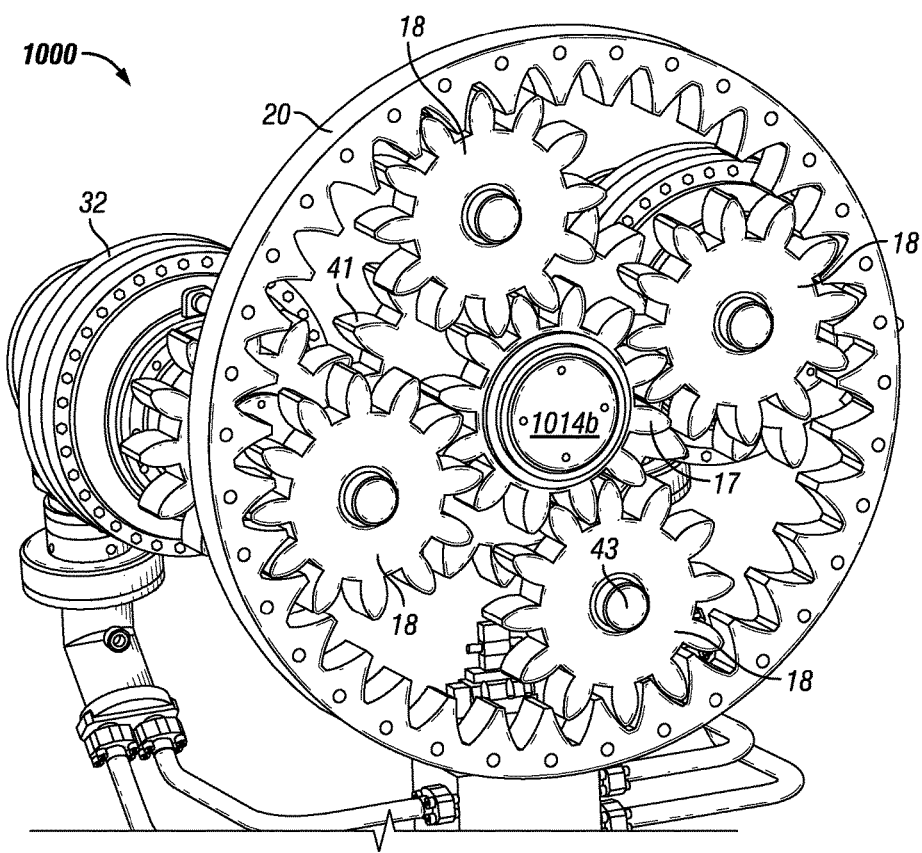
Figure 22C:
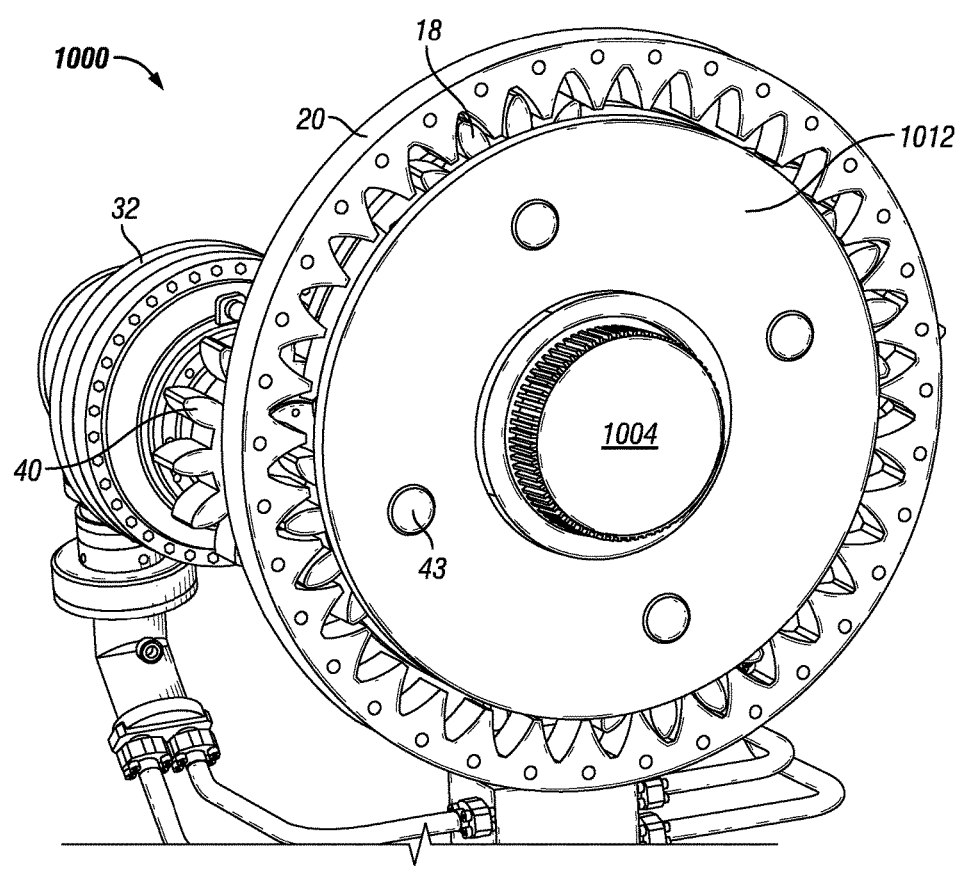
Figure 22D:
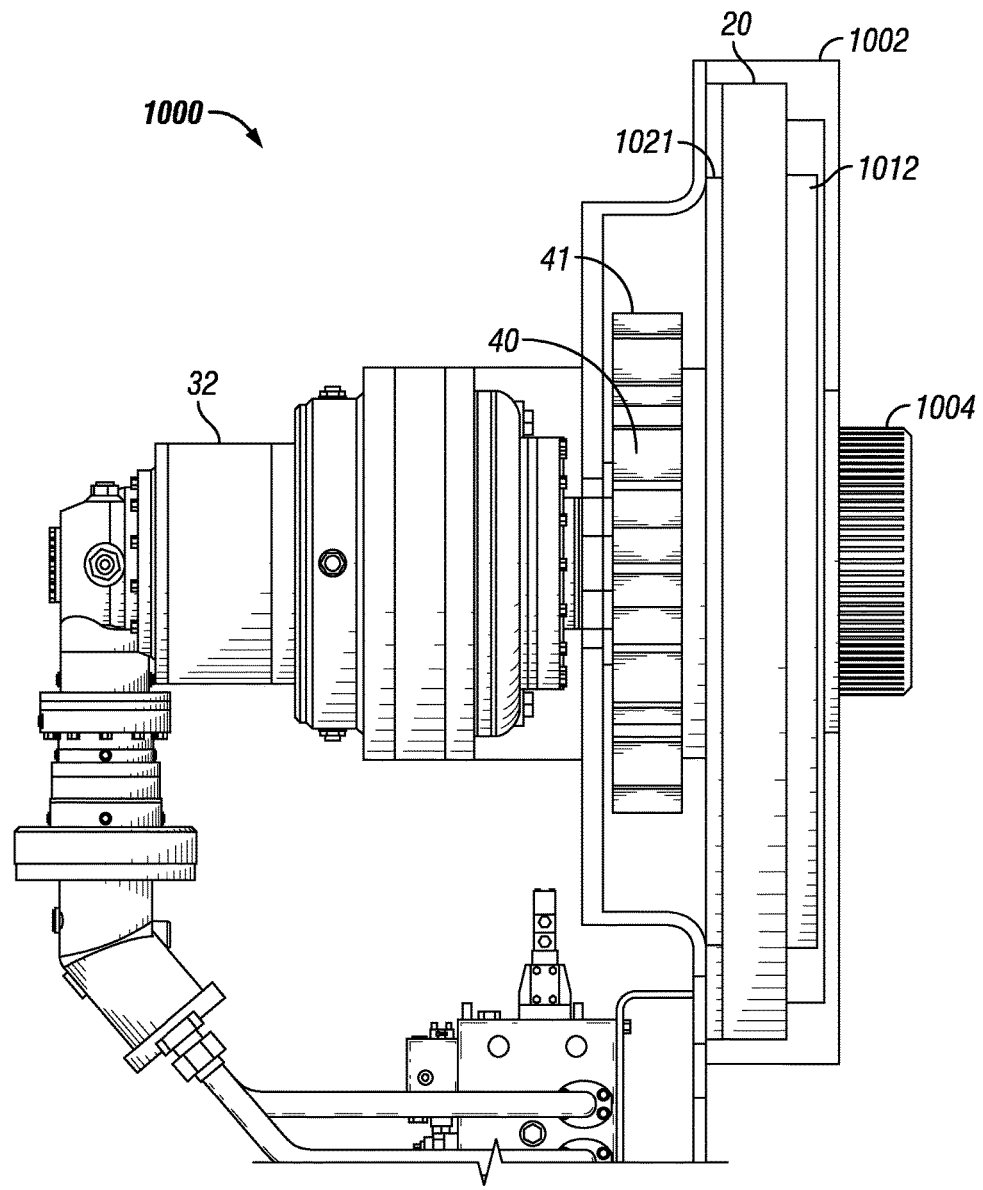

The second stage of gear reduction is shown in FIG. 22B. Sun gear 17 is coupled (e.g., affixed thereto) to axel 1014. Sun gear 17 is operatively coupled to one or more planetary gears 18, each operatively coupled to a planetary gear shaft 43. Each planetary gear 18 is operatively coupled to internal ring gear 20. Internal ring gear 20 is coupled to a portion of housing 1002. As shown, internal ring gear 20 is coupled to second housing section 1002*b*. In operation, internal ring gear 20 of movable drive mechanism 1000 is static and does not rotate. Drive gear 1004 is coupled to or integral with outer plate 1012, which is operatively coupled to each planetary gear shaft 43 on non-motor side of axel 1014*b*. In operation, rotation of bull gear 41 may rotate axel 1014, rotation of axel 1014 may rotate sun gear 17, rotation of sun gear 17 may rotate planetary gears 18 along static internal ring gear 20, and may rotate outer plate 1012, thereby rotating drive gear 1004.

Figure 23A:
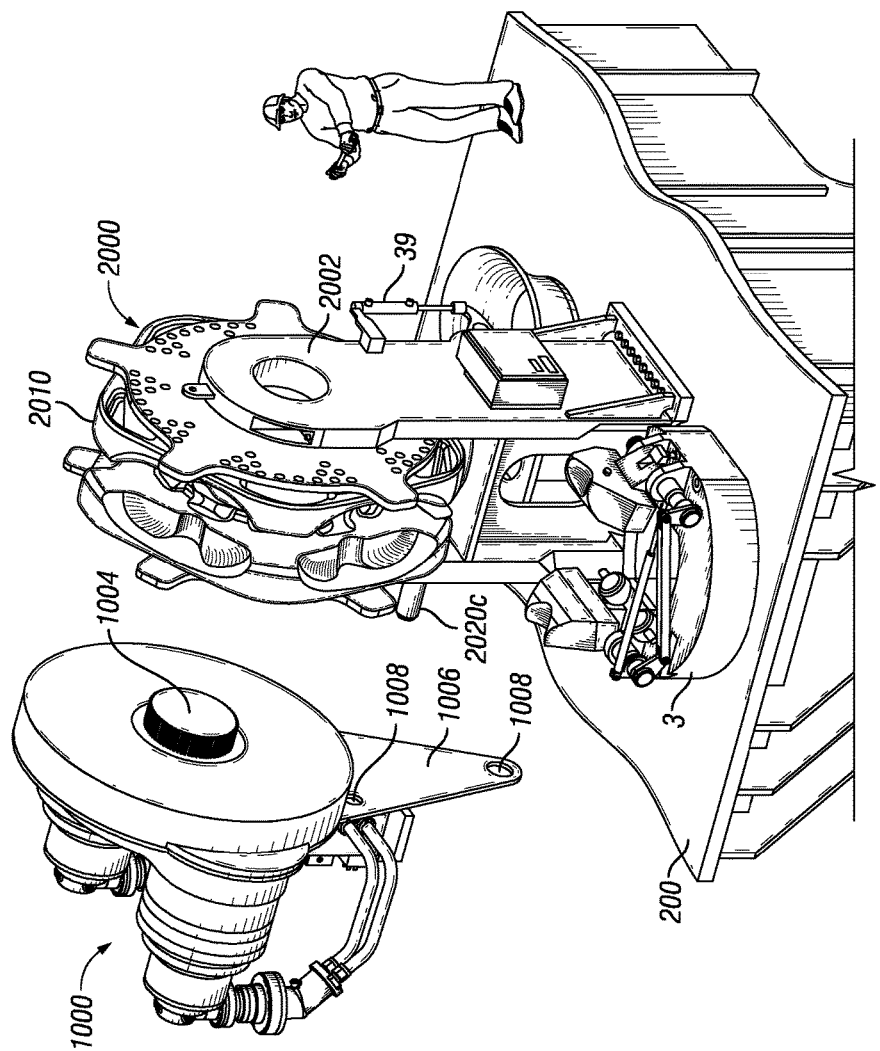
FIGS. 23A and 23B depict the movable drive mechanism disengaged from a dual chain mooring windlass in accordance with certain embodiments of the present disclosure.
Figure 23B:
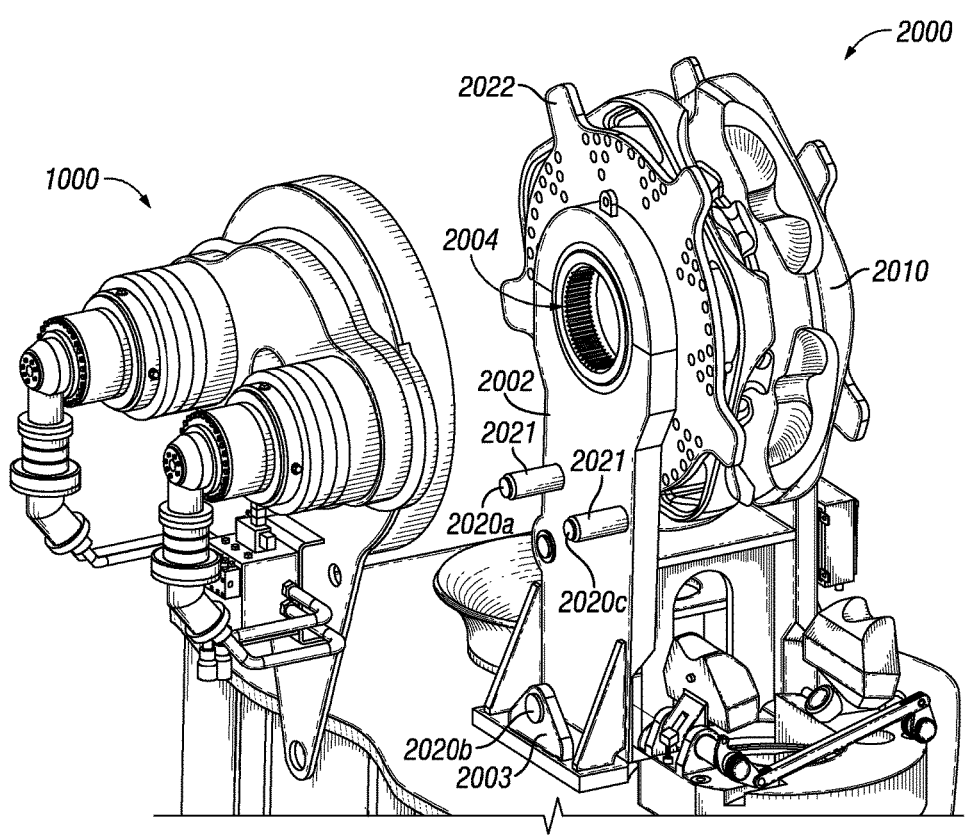

FIGS. 23A and 23B depict movable drive mechanism 1000 separated from chain wheel assembly 2000. Movable drive mechanism 1000 may be configured to mechanically couple with chain wheel assembly 2000 (e.g., a chain mooring windlass). For example and without limitation, chain wheel assembly 2000 includes one or more pins 2020*a*, 2020*b* and 2020*c* configured to fit within pin holes 1008 of chain wheel coupler 1006. Each pin 2020*a*, 2020*b*, and 2020*c* may be configured to extend into one of pin holes 1008 to a predetermined distance. For example, pins 2020*a*, 2020*c* include pin bases 2021. Each of pins 2020*a*, 202 may have a shape and size configured to fit within one of pin holes 1008, and each of pin bases 2021 may have a shape and/or size configured to prevent pin bases 2021 from fitting into pin holes 1008. Also, for example, pin 2020*b* may be coupled to or integral with pin bracket 2003. Pin 2020*b* may have a shape and size configured to fit within one of pin holes 1008, and pin bracket 2003 may have a shape and/or size configured to prevent pin bracket 2003 from fitting into pin holes 1008. Each of pins 2020*a*, 2020*b*, 2020*c*, pin bases 2021, and pin bracket 2003 are coupled to or integral with chain wheel assembly frame 2002. Chain wheel assembly frame 2002 is mechanically coupled with offshore vessel 200, such as via bolting. In some embodiments, movable drive mechanism 1000 may be bolted or otherwise fixed to chain wheel assembly 2000. For example and without limitation, bolts may be affixed threaded onto or into a portion of pins 2020*a*, 2020*b*, and 2020*c* to affix movable drive mechanism 1000 to chain wheel assembly 2000. In one embodiment, bolts (not shown) may hold, such as through a retainer plate, moveable drive mechanism 1000 against shoulder steps on pins 2020*a*, 2020*b*, and 2020*c*, and the end faces of pins 2020*a*, 2020*b*, and 202*c* may be thread-hole tapped to accommodate bolts. Those skilled in the art understand that mechanical coupling of movable drive mechanism 1000 to chain wheel assembly 2000 is not limited to the particular embodiments shown in the Figures. Thus, movable drive mechanism 1000 may be coupled to chain wheel assembly 2000 in any manner known to those skilled in the art. Movable drive mechanism 1000 and chain wheel assembly 2000 may be coupled in such a way that, when movable drive mechanism 1000 is torqueing, movable drive mechanism 1000 does not become dislodged from or otherwise disengaged from chain wheel assembly 2000 due to torqueing forces.

Drive gear 1004 may be configured to operatively engage chain wheel drive gear 2004. Chain wheel drive gear 2004 is operatively coupled to chain wheel. In one embodiment chain wheel drive gear 2004 is integral with chain wheel assembly adapter plate 2022, and chain wheel assembly adapter plate 2022 is operatively coupled to chain wheel 2010. In operation, when movable drive mechanism 1000 is selectively engaged with chain wheel assembly 2000, drive gear 1004 is operatively engaged to chain wheel drive gear 2004. In one embodiment, rotation of drive gear 1004 rotates chain wheel drive gear 2004, rotation of chain wheel drive gear 2004 rotates chain wheel assembly adapter plate 2022, rotation of chain wheel assembly adapter plate 2022 rotates chain wheel 2010, and rotation of chain wheel 2010 results in the hauling in or deployment of any anchor chain and/or anchor operatively coupled with chain wheel 2010.

While coupling of movable drive mechanism 1000 with chain wheel assembly 2000 is shown and described as being accomplished via pin holes 1008 and pins 2020*a*, 2020*b*, 2020*c*, one skilled in the art would understand that coupling of movable drive mechanism 1000 with chain wheel assembly 2000 may be accomplished in any number of ways such that movable drive mechanism 1000 is selectively attachable and detachable to chain wheel assembly 2000. In some embodiments, chain wheel assembly 2000 is a chain wheel assembly that is manufactured to be configured to couple with movable drive mechanism 1000. In other embodiments, chain wheel assembly 2000 is a chain wheel assembly that is retrofitted to couple with movable drive mechanism 1000.

Figure 24A:
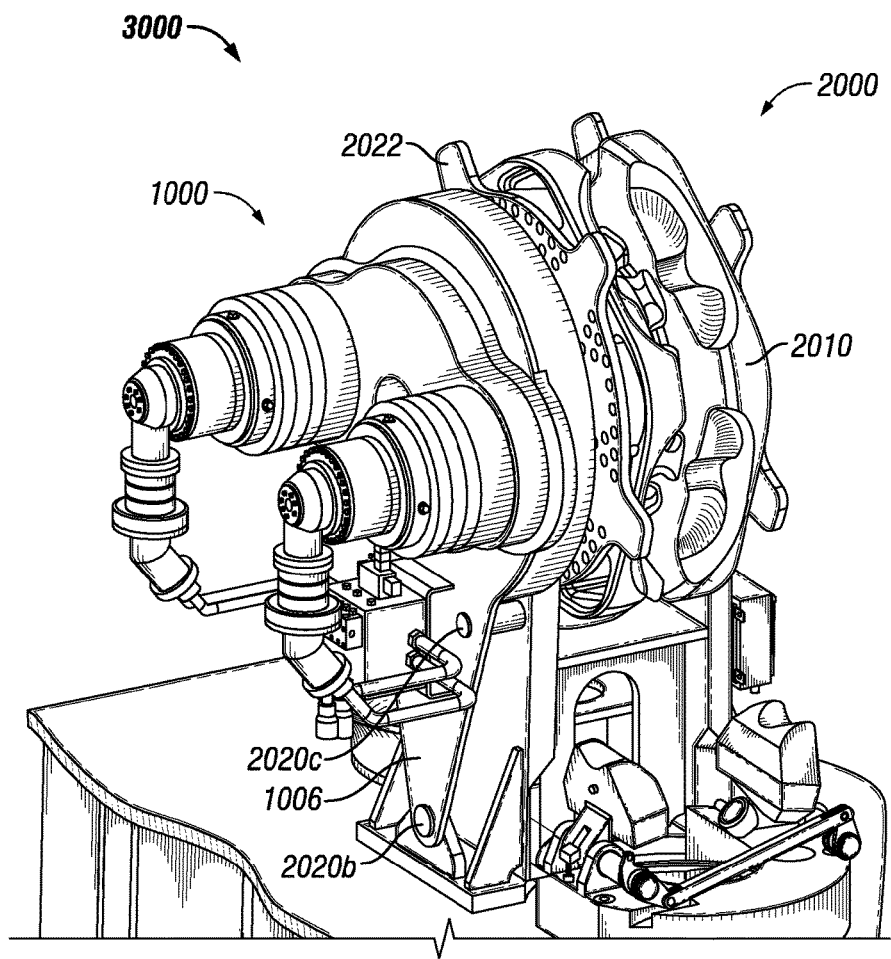
FIGS. 24A and 24B depict the movable drive mechanism engaged with a dual chain mooring windlass in accordance with certain embodiments of the present disclosure.
Figure 24B:
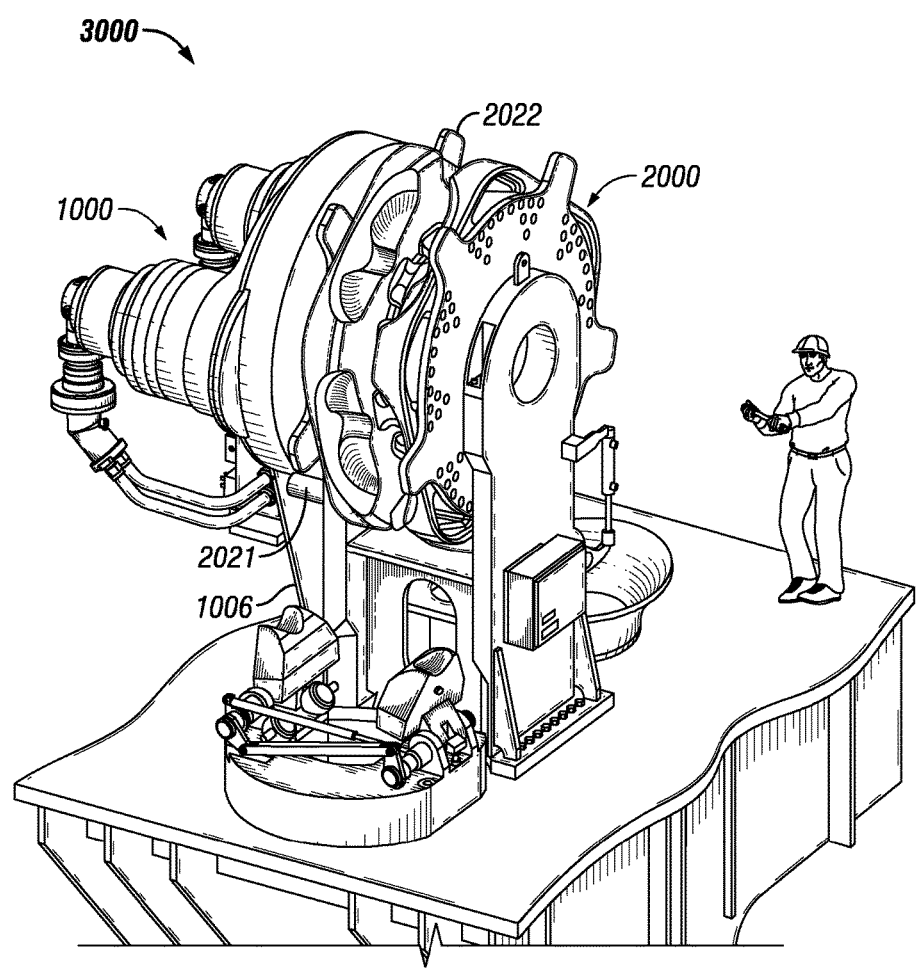

FIGS. 24A and 24B depict mooring windlass assembly 3000, including movable drive mechanism 1000 coupled to chain wheel assembly 2000. In operation, movable drive mechanism 1000 may be selectively coupled to a first chain wheel assembly for operation thereof, then decoupled from the first chain wheel assembly, and subsequently selectively coupled to a second chain wheel assembly for operation thereof. Thus, a single movable drive mechanism 1000 may be used to operate multiple chain wheel assemblies. As such, in some embodiments, a single movable drive mechanism 1000 can be used on an offshore vessel to operate multiple chain wheel assemblies located on the offshore vessel. Moveable drive mechanism 1000 may include one, two, or more than two stages of gear reduction. In some embodiments, moveable drive mechanism 1000 may be used in conjunction with additional stages of gear reduction, which may be on the same or an opposite side of the chain wheel 10 that moveable drive mechanism 1000 is coupled to. In other embodiments, moveable drive mechanism 1000 is not used in conjunction with nay additional stages of gear reduction.

Use of one and two-stage gear reductions described with respect to FIGS. 1-24B, may require fewer drive assemblies than if bull gear 41 were mounted on chain wheel 10, without a gear reduction. Use of a gear reduction may allow for fewer drive assemblies 32, which may, in some embodiments, reduce the overall financial cost of chain mooring windlass.

In some embodiments, during use of embodiments of the two-stage gear reduction described with respect to FIGS. 1-24B, motors of drive assemblies 32 may operate (i.e., spin) at a higher rpm than if bull gear 41 were mounted on chain wheel 10, without the second stage of gear reduction.

In some embodiments, during use of embodiments of the two-stage gear reduction described with respect to FIGS. 1-24B, gear tooth loading on one or more gears of drive assemblies 32 is less than if bull gear 41 were mounted on chain wheel 10, without the second stage of gear reduction.

Gear Reduction Method

Some embodiments relate to a gear reduction method for a chain mooring windlass. The gear reduction method may be implemented using any of the embodiments of the chain mooring windlass and/or movable drive mechanism depicted in FIGS. 1-24B. The gear reduction method includes providing a first stage of gear reduction and a second stage of gear reduction between drive assemblies of the chain mooring windlass and a chain wheel of the chain mooring windlass. The two stages of gear reduction may be provided in any of the manners depicted and described with respect to any of FIGS. 1-24B.

In the gear reduction method, the first stage of gear reduction may drive an axel (e.g., chain wheel axel 14 or axel 1014) of the chain mooring windlass. The chain wheel may be configured to rotate freely with respect to the axel. The axel is coupled with gears of the second stage of gear reduction. One or more gears of the second stage of gear reduction may drive the chain wheel, such as via adapter plate 22 or 2022.

The gear-reduction method may be used to haul-in or deploy an anchor chain, for example. In certain embodiments, the gear-reduction method includes selectively shifting between a fast/light mode and a slow/heavy mode, as depicted and described with respect to FIGS. 15A-20C. In some embodiments, a chain mooring windlass with no shift mechanism is used in the gear-reduction method, as shown and described with respect to FIGS. 13A-14B.

Single Drive Method

Some embodiments relate to a single-drive method using a single movable drive mechanism to selectively operate multiple chain mooring windlasses. The single-drive method may be implemented using any of the embodiments of the movable drive mechanism depicted in FIGS. 21A-24B.

The single-drive method includes providing a movable drive mechanism (e.g., movable drive mechanism 1000). The single-drive method includes coupling the movable drive mechanism with a first chain wheel assembly, rotating a chain wheel of the first chain wheel assembly, decoupling the movable drive mechanism from the first chain wheel assembly, coupling the movable drive mechanism with a second chain wheel assembly, and rotating a chain wheel of the second chain wheel assembly. This operation may be repeated for any number of chain wheel assemblies on one or more offshore vessels.

In some embodiments, the single-drive method includes providing two stages of gear reduction. The method includes providing a first stage of gear reduction and a second stage of gear reduction between drive assemblies of the chain mooring windlass and a chain wheel of the chain mooring windlass. The two stages of gear reduction may be provided in the manner depicted and described in FIGS. 21A-24B.

The single-drive method may be used to haul-in or pay out an anchor chain, for example. In some embodiments, chain mooring windlass with no shift mechanism is used in the single-drive method, as shown and described with respect to FIGS. 13A-14B. In certain embodiments, the single-drive method includes selectively shifting between a fast/light mode and a slow/heavy mode, as depicted and described with respect to FIGS. 15A-20C.

Offshore Vessel

Certain embodiments relate to an offshore vessel having a chain mooring windlass in accordance with any of FIGS. 1-20C. Other embodiments relate to an offshore vessel having a chain mooring windlass and movable drive mechanism in accordance with any of FIGS. 21A-24B.

Chain Stopping Method

Other embodiments relate to use of a chain stopper assembly in accordance with FIGS. 1-10 for pulling-in, paying-out, and positioning mooring lines to moor offshore vessels. Certain embodiments of such a method may be performed in accordance use of chain stopper assembly 3, as described with reference to FIGS. 3-10.

The various embodiments, or aspects thereof, described herein may be combined. For example, the drive assemblies and two stage gear reductions shown and described with respect to FIGS. 11-20C may be incorporated into the movable drive mechanism, as shown and described with respect to FIGS. 21A-24B. Also, the embodiment without a shift mechanism shown and described with respect to FIGS. 15A-16B or the shift mechanism 400 shown and described with respect to FIGS. 17A-20C, may be incorporated into the movable drive mechanism, as shown and described with respect to FIGS. 21A-24B.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A chain mooring windlass having a two-stage gear reduction, the chain mooring windlass comprising:
   a chain wheel;
   a chain wheel axle extending through the chain wheel;
   one or more drive assemblies coupled to the chain wheel axle via a first stage gear reduction comprising one or more reduction gears, wherein the chain wheel axle is coupled to the chain wheel via a second stage gear reduction comprising one or more reduction gears; and
   wherein the first stage gear reduction includes a reduction gear that drives the chain wheel axle.

2. The chain mooring windlass of claim 1, wherein the first stage gear reduction is located on the same side of the chain wheel as the one or more drive assemblies, and wherein the second stage gear reduction is located on the opposite side of the chain wheel as the one or more drive assemblies.

3. The chain mooring windlass of claim 1, wherein the reduction gears of the first stage gear reduction comprise:
   one or more pinion gears, each coupled to one of the one or more drive assemblies; and
   wherein the reduction gear that drives the chain wheel axle is a bull gear coupled to the one or more pinion gears and to the chain wheel axle, wherein the one or more drive assemblies drive the one or more pinion gears, and the one or more pinion gears drive the bull gear.

4. The chain mooring windlass of claim 3, wherein the pitch diameter of each pinion gear is less than the pitch diameter of the bull gear.

5. The chain mooring windlass of claim 3, wherein the bull gear and the chain wheel axle rotate at the same rate.

6. The chain mooring windlass of claim 3, wherein the second stage gear reduction comprises a planetary gearbox coupled to the chain wheel axle and to the chain wheel.

7. The chain mooring windlass of claim 3, wherein the reduction gears of the second stage gear reduction comprise:
   a sun gear coupled to the chain wheel axle;
   one or more planetary gears coupled to the sun gear; and
   an internal ring gear coupled to the chain wheel, wherein the chain wheel axle drives the sun gear, the sun gear drives the one or more planetary gears, the one or more planetary gears drive the internal ring gear, and the internal ring gear drives the chain wheel.

8. The chain mooring windlass of claim 7, wherein the chain wheel and the internal ring gear rotate at the same rate.

9. The chain mooring windlass of claim 7, wherein the one or more planetary gears share tooth loading equally.

10. The chain mooring windlass of claim 7, wherein the one or more planetary gears are lockable with respect to the internal ring gear.

11. The chain mooring windlass of claim 7, wherein the one or more planetary gears function as idlers.

12. The chain mooring windlass of claim 7, wherein the sun gear has the same pitch diameter as the one or more planetary gears.

13. The chain mooring windlass of claim 7, wherein the sun gear has a different pitch diameter than the pitch diameters of the one or more planetary gears.

14. The chain mooring windlass of claim 7, further comprising one or more plungers, wherein at least one planetary gear is rotatable about each plunger.

15. The chain mooring windlass of claim 14, wherein each plunger is movable with respect to the chain wheel.

16. The chain mooring windlass of claim 15, wherein each plunger is movable between a first position engaging the chain wheel, and a second position clear of the chain wheel.

17. The chain mooring windlass of claim 16, further comprising a shift mechanism configured to move each plunger between the first position and the second position to selectively control rotational speed of the chain wheel relative to load on the chain wheel, wherein engagement of each plunger with the chain wheel configures the chain mooring windlass for operation at in a fast/light mode, and wherein when each plunger is clear of the chain wheel the chain mooring windlass is configured to operate in a slow/heavy mode.

18. The chain mooring windlass of claim 7, further comprising:
   an inner plate and outer plate supporting the one or more planetary gears;
   one or more planetary gear pins mounted to the outer plate, wherein each planetary gear is mounted on one of the planetary gear pins; and
   a first fixed holding plate mounted onto a windlass frame on a first side of the chain wheel, and a second fixed holding plate mounted onto the windlass frame on a second side of the chain wheel, wherein the first fixed holding plate reacts to bearing load from the chain wheel axle, and wherein the second fixed holding plate reacts to bearing load from the chain wheel axle and torsion from the outer plate.

19. The chain mooring windlass of claim 1, wherein the reduction gear that drives the chain wheel axle is fixed to the chain wheel axle.

20. The chain mooring windlass of claim 1, wherein the second stage gear reduction includes a reduction gear that is driven by the chain wheel axle.

21. The chain mooring windlass of claim 20, wherein the second stage gear reduction includes another reduction gear that drives the chain wheel.

22. A movable drive mechanism for driving chain mooring windlasses, the movable drive mechanism comprising:
   one or more reduction gears including reduction gears of a first stage gear reduction and reduction gears of a second stage gear reduction, wherein the second stage gear reduction includes a planetary gear box;
   one or more drive assemblies coupled to the reduction gears, wherein the drive assemblies drive the reduction gears;
   a drive gear coupled to the reduction gears, wherein the reduction gears drive the drive gear; and
   a chain wheel coupler to selectively couple the movable drive mechanism to a chain mooring windlass.

23. A gear reduction method for chain mooring windlasses, the gear reduction method comprising:
   providing a first stage of gear reduction and a second stage of gear reduction, wherein both the first and second stages of gear reduction are located between drive assemblies of a chain mooring windlass and a chain wheel of the chain mooring windlass, and wherein a chain wheel axle extends through the chain wheel;

driving the chain wheel axle with the first stage of gear reduction;

driving the second stage of gear reduction with the chain wheel axle; and driving the chain wheel with the second stage of gear reduction.

24. The method of claim 23, wherein the second stage of ear reduction includes a planetary gear box.

25. A chain mooring windlass having a two-stage gear reduction, the chain mooring windlass comprising:

a chain wheel; and one or more drive assemblies coupled to the chain wheel via a first stage gear reduction and a second stage gear reduction, wherein the second stage gear reduction includes a planetary gear box.

26. The chain mooring windlass of claim 25, wherein the planetary gear box includes a reduction gear that drives the chain wheel.

\* \* \* \* \*